United States Patent
Mori

(10) Patent No.: US 8,228,544 B2
(45) Date of Patent: Jul. 24, 2012

(54) JOB CONTROLLING APPARATUS, JOB CONTROLLING METHOD, AND STORAGE MEDIUM

(75) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 12/536,121

(22) Filed: Aug. 5, 2009

(65) Prior Publication Data

US 2010/0157326 A1    Jun. 24, 2010

(30) Foreign Application Priority Data

Aug. 7, 2008 (JP) ................................. 2008-204833

(51) Int. Cl.
*G06F 15/00* (2006.01)
*B41J 9/44* (2006.01)

(52) U.S. Cl. ........................................ 358/1.15; 400/61
(58) Field of Classification Search .................. 358/1.15
See application file for complete search history.

(56) References Cited

U.S. PATENT DOCUMENTS

2007/0091331 A1* 4/2007 Ohashi .......................... 358/1.2

FOREIGN PATENT DOCUMENTS

| JP | 2004-220471 A | 8/2004 |
| JP | 2007-8690 A | 1/2007 |

* cited by examiner

*Primary Examiner* — Saeid Ebrahimi Dehkordy

(74) *Attorney, Agent, or Firm* — Canon U.S.A., Inc. IP Division

(57) ABSTRACT

The amount of expansion or contraction of a sheet is derived from the sheet size before printing and the sheet size after the printing to adjust the position on the sheet where post-processing is performed based on the derived amount of expansion or contraction. Even if the sheet size is varied from a normal sheet size before the printing due to an image forming process in an MFP or the sheet that is left, it is possible to adjust the position in accordance with the variation in the sheet size.

18 Claims, 18 Drawing Sheets

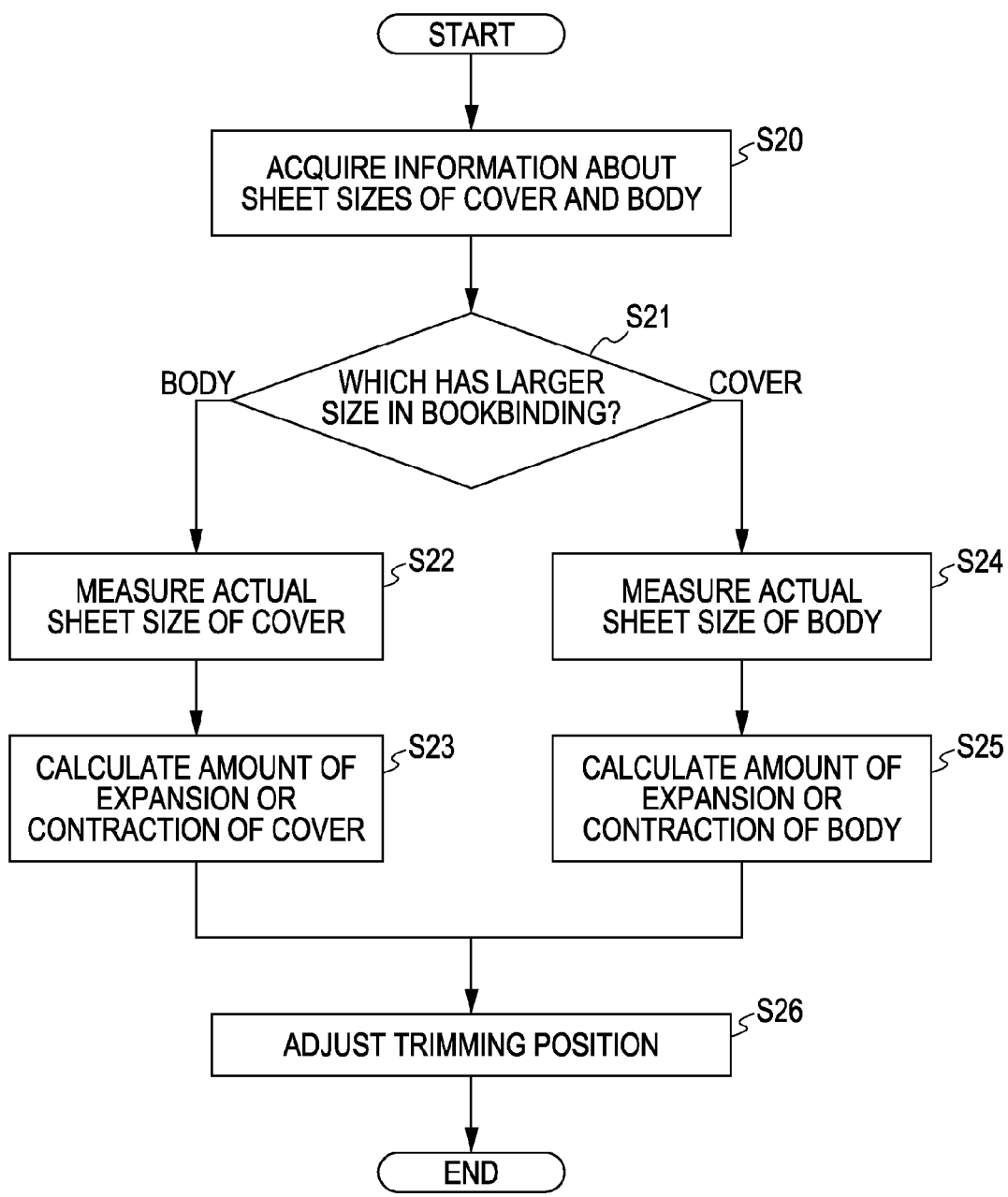

JOB CONTROLLING APPARATUS, JOB CONTROLLING METHOD, AND STORAGE MEDIUM

BACKGROUND OF THE INVENTION

1. Field of the Invention

The present invention relates to an apparatus, a method, and a computer program. More particularly, the present invention is applicable to control of post-processing for a sheet on which an image is formed.

2. Description of the Related Art

In recent years, Print On Demand (POD) has emerged against the printing industry with the increasing speeds and the improved image qualities of electrophotographic printing apparatuses and ink-jet printing apparatuses. The POD is intended to process jobs in smaller lots, compared with those processed in the printing apparatuses, at short delivery times without using large-scale apparatuses or systems. For example, POD markets that have emerged make the best use of digital image forming apparatuses, such as digital copiers and digital multifunction machines, to realize digital printing using electronic data in order to do business.

In such POD markets, digitalization penetrates into systems and management and control using computers have prevailed, compared with the printing industry in related art. The use of computers causes the level (for example, the quality) of the POD markets to come close to the level of the printing industry to some extent. In such a background, the POD markets include printing services in copy-print shops and printing companies and printing services for intra-company.

Near-line finishers have come into use as finisher apparatuses, along with in-line finishers physically connected to image processing apparatuses. The near-line finishers are physically separated from image processing apparatuses but are connected to the image processing apparatuses via networks so as to be communicable with the image processing apparatuses.

In a typical system using a near-line finisher, after printing is finished in an image processing apparatus, an operator carries printed sheets to the near-line finisher where post-processing for the printed sheets is performed. In a job using the near-line finisher, the operator inputs a parameter indicating where the post-processing is performed on a sheet based on the size of the sheet used in the printing.

In such a system, the size of the sheet can be varied with time after the printing due to the effect of the heat generated in fixing of toner in the image processing apparatus and/or the effect of the temperature and humidity of a room where the printed sheets are left. The variation in the sheet size may cause the post-processing not to perform at a position which the operator has specified. As measures against this matter, a technology is proposed in which information about the amount of expansion or contraction in the conveying direction of sheets is detected to change the registration position in a finisher apparatus based on the amount of expansion or contraction (refer to Japanese Patent Laid-Open No. 2007-8690).

However, since only the amount of expansion or contraction in the conveying direction of sheets is detected in the above technology, positive effects can be expected only in specific post-processing, such as saddle stitching. Accordingly, there may be a case in that outputs are not produced due to the variation in the sheet size depending on the content of the post-processing.

In addition, there is also a be a case in that only the change of the registration position in the finisher apparatus does not allow precise adjustment of the position where the post-processing is performed because the sizes of image areas are also expanded or contracted due to the expansion or contraction of the sheets. For example, if trimming at the boundary between an image area and a blank area is set for a printed sheet having an image printed on the entire sheet, a part can possibly be trimmed or not depending on the trimming position that is shifted due to the extraction or contraction of the sheet.

SUMMARY OF THE INVENTION

According to an aspect of the present invention, an apparatus includes a deriving unit configured to derive an amount of expansion or contraction by using a size of a sheet specified for printing of an image before the image is printed and a size of the specified sheet after the image is printed; and a position changing unit configured to change a position where a post-processing is performed based on the derived amount of expansion or contraction.

According to another aspect of the present invention, a method includes deriving an amount of expansion or contraction by using a size of a sheet specified for printing of an image before the image is printed and a size of the specified sheet after the image is printed; and changing the position where a post-processing is performed based on the derived amount of expansion or contraction.

According to another aspect of the present invention, a storage medium stores a computer-executable program that causes a computer to perform a method. The method includes deriving an amount of expansion or contraction by using a size of a sheet specified for printing of an image before the image is printed and a size of the specified sheet after the image is printed; and changing a position where a post-processing is performed based on the derived amount of expansion or contraction.

Further features of the present invention will become apparent from the following description of exemplary embodiments with reference to the attached drawings.

BRIEF DESCRIPTION OF THE DRAWINGS

FIG. 15 is a flowchart showing an example of a process of adjusting the post-processing position in a "job including post-processing" using multiple kinds of sheets according to the first exemplary embodiment of the present invention.

DESCRIPTION OF THE EMBODIMENTS

A first exemplary embodiment of the present invention will herein be described with reference to the attached drawings.

An example of the configuration of a POD system will now be described with reference to FIGS. 1 to 4.

Figure 1:
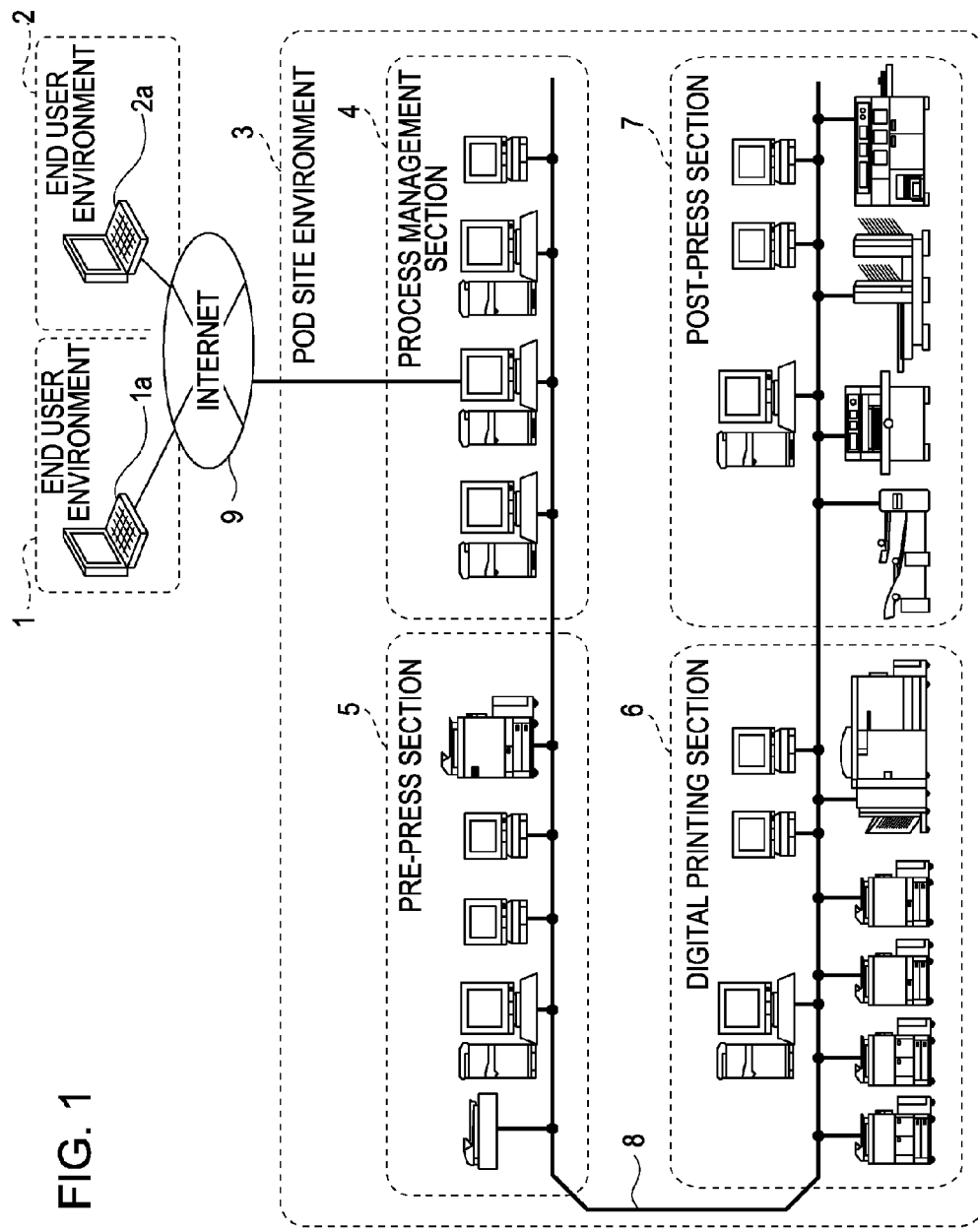
FIG. 1 illustrates an example of the entire basic configuration of a POD system (printing system) according to a first exemplary embodiment of the present invention.

FIG. 1 illustrates an example of the entire basic configuration of the POD system (printing system) according to the first exemplary embodiment of the present invention.

Referring to FIG. 1, the POD system includes end user environments 1 and 2 and a POD site environment 3 connected to the end user environments 1 and 2 via the Internet 9.

In the end user environments 1 and 2, orders who order printing use a client personal computer (PC) 1a and a client PC 2a in the end user environments 1 and 2, respectively, to request print jobs and/or to confirm the statuses of jobs.

The POD site environment 3 normally includes a process management section 4, a pre-press section 5, a digital printing section 6, and a post-press section 7. The post-press section 7 is utilized when a finishing apparatus connected to a digital image processing apparatus, such as a digital copier or a digital multifunction machine, does not have a sufficient function or capability.

The process management section 4 issues an operational instruction to each of the pre-press section 5, the digital printing section 6, and the post-press section 7 in the POD site environment 3 to manage the work flow of the POD system including computers and various devices. In addition, the process management section 4 receives jobs from the end user environments 1 and 2, stores the received jobs, and efficiently schedules the works of each device and each operator.

The pre-press section 5 scans a paper document received from the end user environment 1 or 2 in accordance with an operational instruction of a pre-press job received from the process management section 4. The scanned paper document is input into a pre-press server or a client PC as a scanned image file. In addition, the pre-press section 5 performs image correction, merging of files, insertion and deletion of pages, editing of various page layouts, and imposition. Furthermore, the pre-press section 5 may perform proof output for confirming the layouts and colors of final outputs.

The digital printing section 6 copies a paper document received from the end user environment 1 or 2 or prints out an image file transmitted from a client PC in accordance with an operational instruction of a job received from the process management section 4 or the pre-press section 5.

The post-press section 7 controls post-processing devices, such as a paper folder, a saddle stitcher, a case binder, a trimmer, a sealer, and a collator, in accordance with operational instructions of post-press jobs received from the process management section 4 or the digital printing section 6. In addition, the post-press section 7 performs finishing processes including paper folding, saddle stitching, case binding, trimming, sealing, and collation to a printed document output from the digital printing section 6.

Figure 2:
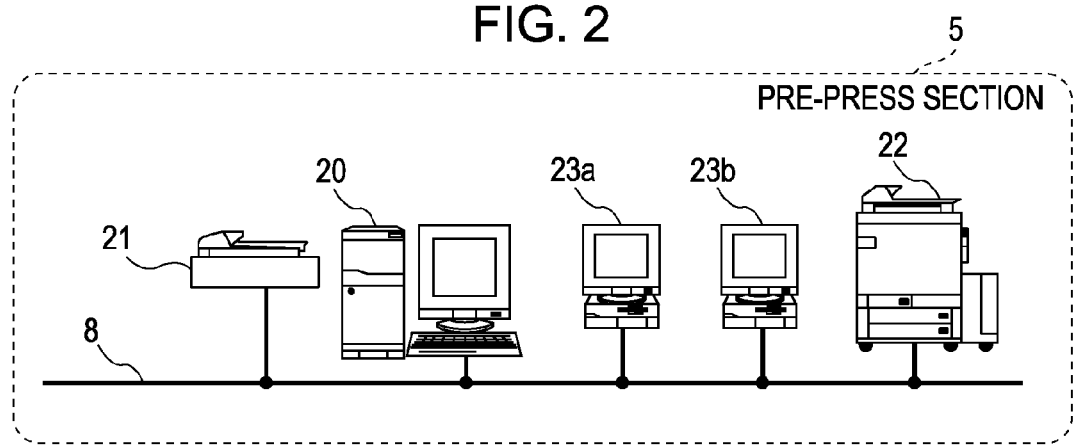
FIG. 2 illustrates an example of the configuration of a pre-press section in the POD system according to the first exemplary embodiment of the present invention.

FIG. 2 illustrates an example of the configuration of the pre-press section 5 in the POD system.

Referring to FIG. 2, the pre-press section 5 includes a pre-press server 20, a scanner 21, a multifunction peripheral (MFP) 22, and client PCs 23a and 23b. The client PCs 23a and 23b are collectively referred to as a client PC 23. The pre-press server 20, the client PC 23, the scanner 21, and the MFP 22 in the pre-press section 5 are connected to each other via a network 8, such as a local area network (LAN), to transfer a job received by the pre-press section 5 and to issue a control command in order to process the job.

The pre-press server 20 receives an image of a paper document that is received from the end user environment 1 or 2 and that is scanned by a scanning device, such as the scanner 21 or the MFP 22, as a scanned image file.

In addition, the pre-press server 20 performs image correction, merging of multiple files (document files, image files, and scanned image file), insertion and deletion of pages, editing of various page layouts, and imposition.

When the job received from the end user environment 1 or 2 is a copy job, a paper document is scanned by a scanning device, such as the scanner 21 or the MFP 22, as described above. Then, data on the scanned paper document is input into the pre-press server 20 or the client PC 23 as a scanned image file.

When the job received from the end user environment 1 or 2 is a print job, a document or an image file received from the end user environment 1 or 2 is input into the pre-press server 20 or the client PC 23.

When the image file received from the end user environment 1 or 2 is to be further edited, the pre-press section 5 performs the following processing. Specifically, the pre-press section 5 inserts a page of another image file into an image file to be edited or deletes a page from the image file to be edited in accordance with an instruction that is issued from an operator who is confirming the layouts of multiple pages. The pre-press section 5 edits various page layouts or performs the imposition. For example, the pre-press section 5 adds page numbers and/or annotations, specifies N-up printing, or specifies post-processing, such as stapling, punching, and/or Z folding.

Figure 3:
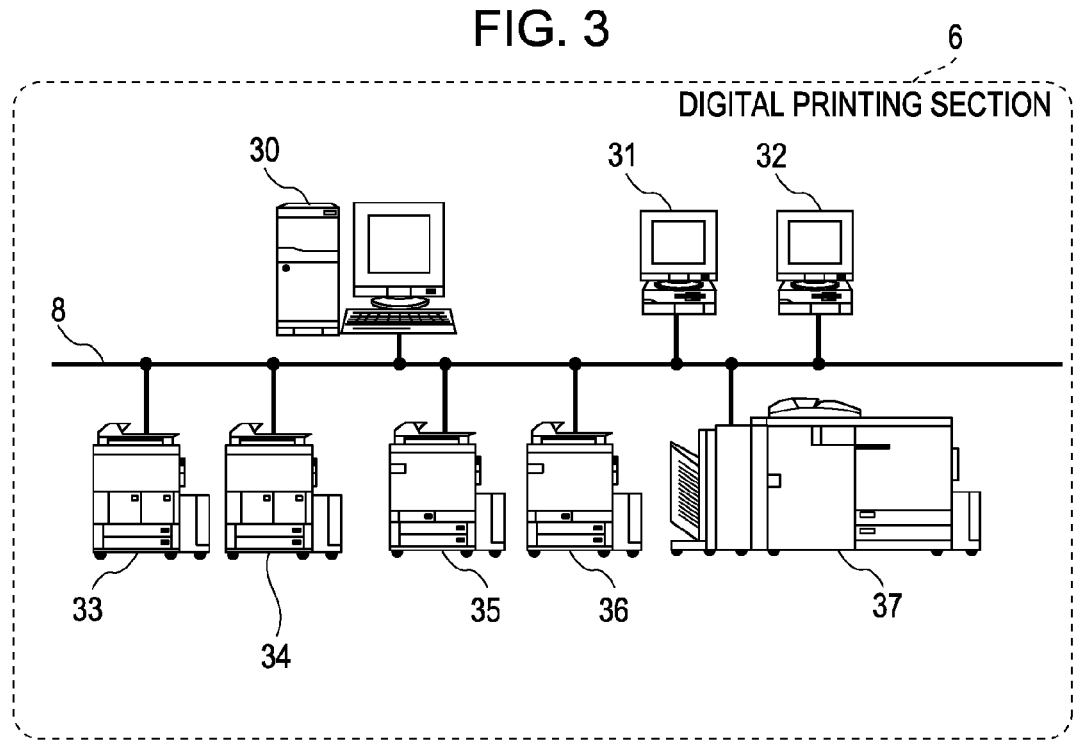
FIG. 3 illustrates an example of the configuration of a digital printing section in the POD system according to the first exemplary embodiment of the present invention.

FIG. 3 illustrates an example of the configuration of the digital printing section 6 in the POD system. In the example shown in FIG. 3, the digital printing section 6 includes a print server 30, client PCs 31 and 32, color MFPs 35 to 37, and monochrome MFPs 33 and 34 that are connected to each other via the network 8.

The print server 30 performs two functions. First, the print server 30 transmits and receives information to and from a device outside the digital printing section 6. Image information and setup information about a job that is received is input into the print server 30. After the execution of the job is terminated, the print server 30 notifies the external device of information, such as the status of the job.

Secondly, the print server 30 performs management and control in the digital printing section 6. Specifically, the print server 30 monitors the statuses of all the devices in the digital printing section 6 and the statuses of all the jobs (including jobs that are externally input and jobs occurring in the digital printing section 6). In addition, for example, the print server 30 pauses a job, changes the setting of a job, restarts printing, copies a job, moves a job, or deletes a job.

Each of the client PCs 31 and 32 edits an application file that is input, issues a print instruction, or supplies a print-ready file. In addition, each of the client PCs 31 and 32 assists monitoring and control of devices and jobs managed in the print server 30.

The color MFPs 35, 36, and 37 and the monochrome MFPs 33 and 34 are image processing apparatuses having various functions, such as scanning, printing, and copying. Since the color MFPs differ from the monochrome MFPs in speed and cost, the color MFPs and the monochrome MFPs are selectively used depending on various applications. A finisher apparatus (an in-line finisher apparatus) is connected to (is provided with) the color MFP 37.

Figure 4:
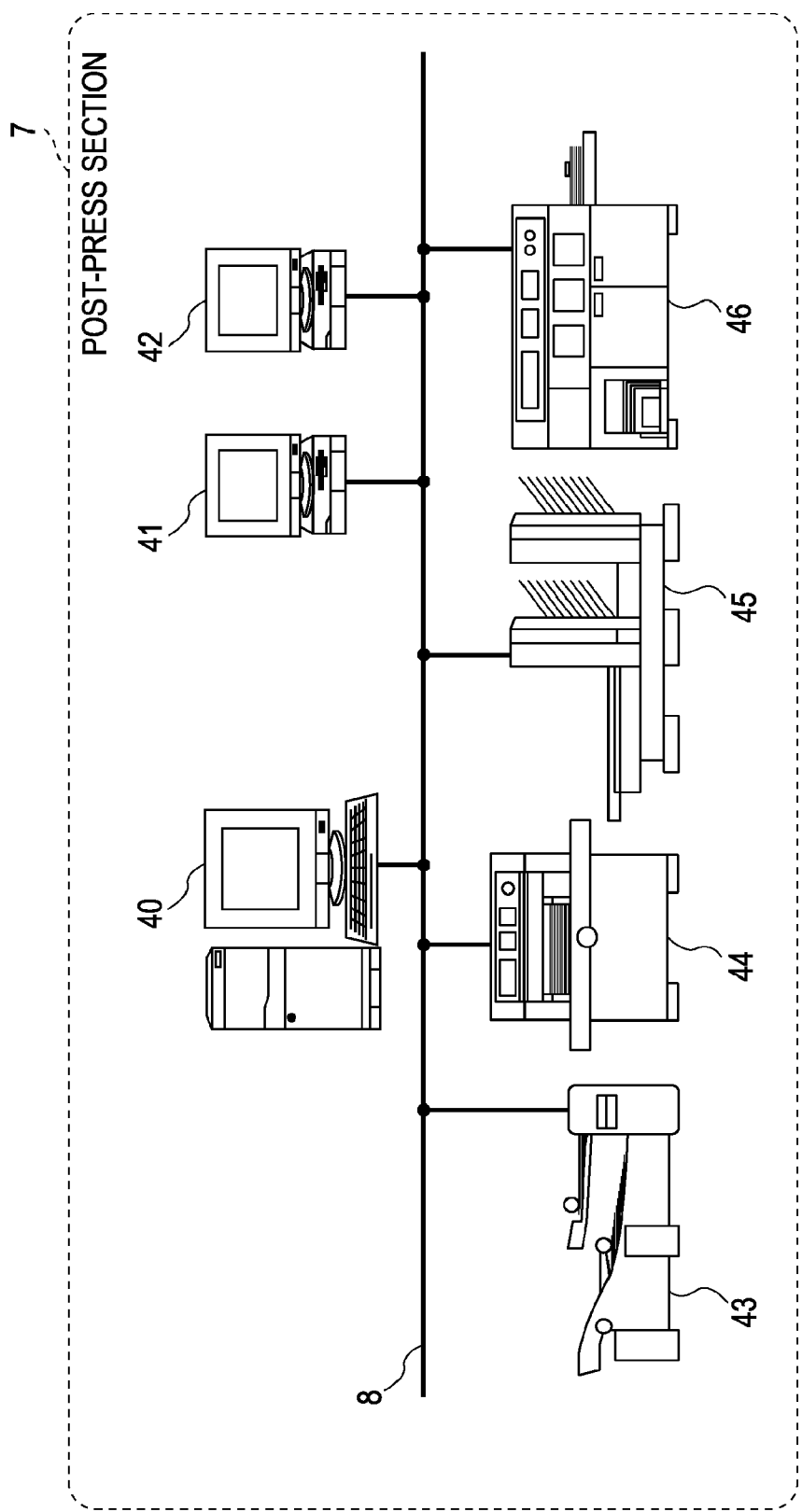
FIG. 4 illustrates an example of the configuration of a post-press section in the POD system according to the first exemplary embodiment of the present invention.

FIG. 4 illustrates an example of the configuration of the post-press section 7 in the POD system. Referring to FIG. 4, the post-press section 7 includes a post-press server 40, client PCs 41 and 42, and post-processing devices typified by a paper folder 43, a trimmer 44, a saddle stitcher 45, and a case binder 46. The post-press server 40, the client PCs 41 and 42, the paper folder 43, the trimmer 44, the saddle stitcher 45, and the case binder 46 are connected to each other via the network 8.

The post-press server 40 is a computer managing post-processing processes and controls the jobs executed in the post-press section 7. The post-press server 40 creates post-processing conditions that can be finished in the post-press section 7 based on, for example, a job instruction from the process management section 4. The post-press server 40 instructs the post-processing (finishing) process satisfying a request from an end user in accordance with the post-processing conditions. In general, the post-press server 40 exchanges information with a device outside the post-press section 7. In addition, the post-press server 40 uses internal commands in the post-press section 7 or the status of the post-press section 7 to exchange information with the post-processing devices.

The post-processing devices are broadly classified into the following three groups. The three groups are defined in the following manner in the first exemplary embodiment.

In-line finisher: The paper path of the in-line finisher is physically connected to an MFP, and operational instructions can be issued and status confirmation can be performed by transmission and reception of electrical information to and from the MFP. The finisher apparatus means the in-line finisher in the following description.

Near-line finisher: The paper path of the near-line finisher is not physically connected to an MFP. Accordingly, an operator is to carry the printed sheets generated in the MFP from the MFP to the near-line finisher and to set the printed sheets in the near-line finisher. However, operational instructions can be issued and status confirmation can be performed by transmission and reception of electrical information to and from the MFP via a communication device, such as the network 8.

Off-line finisher: The paper path of the off-line finisher is not physically connected to an MFP and a communication device for operational instructions and status confirmation is not electrically connected to the MFP. Accordingly, an operator is to carry the printed sheets generated in the MFP from the MFP to the off-line finisher and to set the printed sheets in the off-line finisher. The operator also inputs an operational instruction and visually confirms the status report from the off-line finisher.

The post-processing device is capable of performing the post-processing processes. Specifically, the post-processing device performs various sheet processing processes including a trimming process, a saddle stitching process, a case binding process, a paper folding process, and a punching process for output documents that are printed by an image processing apparatus, such as an MFP. The post-processing device performs the above post-processing processes to process the output documents into a bookbinding format in which the output documents are supplied to end users.

The near-line finisher managed in the post-press server 40 includes a stapler, a puncher, a sealer, a collator, and so on, in addition to the paper folder 43, the trimmer 44, the saddle stitcher 45, and the case binder 46 shown in FIG. 4. The post-press server 40 sequentially performs polling to the near-line finisher with a predetermined protocol to determine the status of the devices and the status of jobs, thereby managing the execution status of the jobs. The multiple post-processing processes (finishing processes) may be performed by separate post-processing devices or may be performed by a single post-processing device. Alternatively, some of the post-processing devices, among the multiple post-processing devices described above, may be included in the system.

Figure 5:
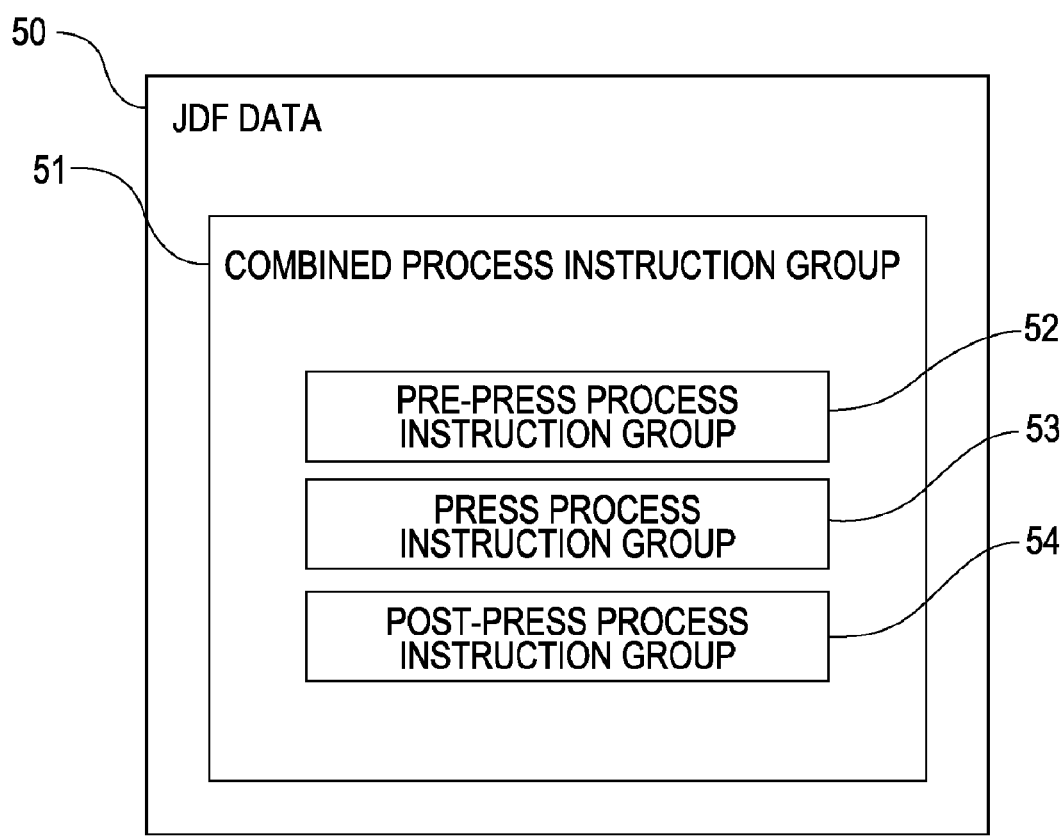
FIG. 5 schematically shows an example of the structure of a job ticket in the POD system according to the first exemplary embodiment of the present invention.

FIG. 5 schematically shows an example of the structure of a job ticket in the POD system. In a Job Definition Format (JDF) data 50, a Pre-press process instruction group 52 has the following content described therein. Specifically, multiple Pre-press process instructions indicating, for example, how print content data (drawing data) such as Portable Document Format (PDF) data is subjected to image processing and how the print content data is arranged are described in the Pre-press process instruction group 52.

Multiple Press process instructions indicating, for example, how the image data generated in accordance with the Pre-press process instruction group 52 is output as printed documents are described in a Press process instruction group 53. Multiple Post-press process instructions indicating how the printed documents that are output in accordance with the Press process instruction group 53 are subjected to the post-processing, such as the case binding, are described in a Post-press process instruction group 54.

A Combined process instruction group 51 is used to integrate the Pre-press process instruction group 52, the Press process instruction group 53, and the Post-press process instruction group 54 into one.

The image processing apparatus (the color MFP 37 in the example shown in FIG. 1) performing digital printing normally has only one output resulting from the execution of the instructions from the Pre-press Process instructions to the Post-press Process instructions for one input of a print job. The Combined process instruction group 51 is used, for example, when an instruction is issued to perform the Pre-press process, the Press process, and the Post-press process for one data input in order to output a result. However, the usage of the Combined process instruction group 51 is not restricted to the above case. Specifically, the Combined process instruction group 51 is used to instruct the image processing apparatus, such as the MFP, executing at least two of the Pre-press process, the Press process, and the Post-press process to output a result. The Pre-press process means a pre-printing process, the Press process means a printing process, and the Post-press process means a post-printing process (finishing process).

Figure 6:
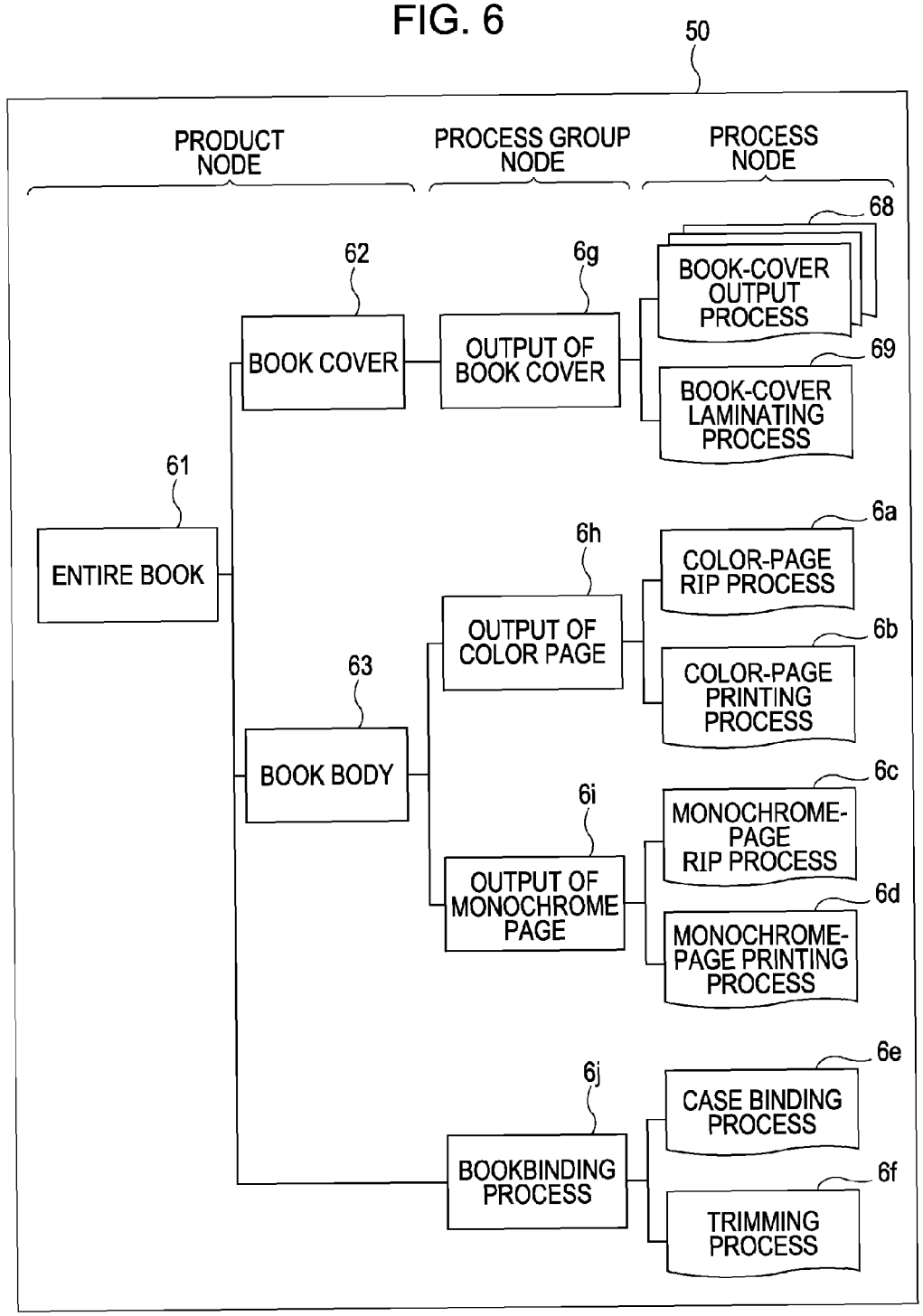
FIG. 6 shows an example of the structure of the job ticket (JDF data) in the POD system according to the first exemplary embodiment of the present invention.

FIG. 6 shows an example of the structure of a job ticket (the JDF data 50) in the POD system. In the example in FIG. 6, the JDF data representing the job ticket is described in an Extensible Markup language (XML) format. The JDF data 50 is represented by a hierarchical structure of nodes. FIG. 6 is a hierarchical diagram illustrating an example of how to perform bookbinding in the JDF.

In order to produce an entire book 61, various processes are to be performed, including production of a book cover 62, production of a book body 63, and binding of the book cover 62 and the book body 63.

In the JDF, in the production of an output, a process of producing a physical output is called a product node. A process of creating each product node is called a process node. A collection of some process nodes is called a process group node (6g-6j). The process group node is an intermediate element in the creation of the product node. The processes are classified in the above manner in the JDF.

The Pre-press process instruction group 52 shown in FIG. 5 corresponds to a color-page raster image process (RIP process) 6a and a monochrome-page RIP process 6c. The Press process instruction group 53 shown in FIG. 5 corresponds to a book-cover output process 68, a book-cover laminating process 69, a color-page printing process 6b, and a monochrome-page printing process 6d. The Post-press process instruction group 54 shown in FIG. 5 corresponds to a case binding process 6e and a trimming process 6f.

Figure 7:
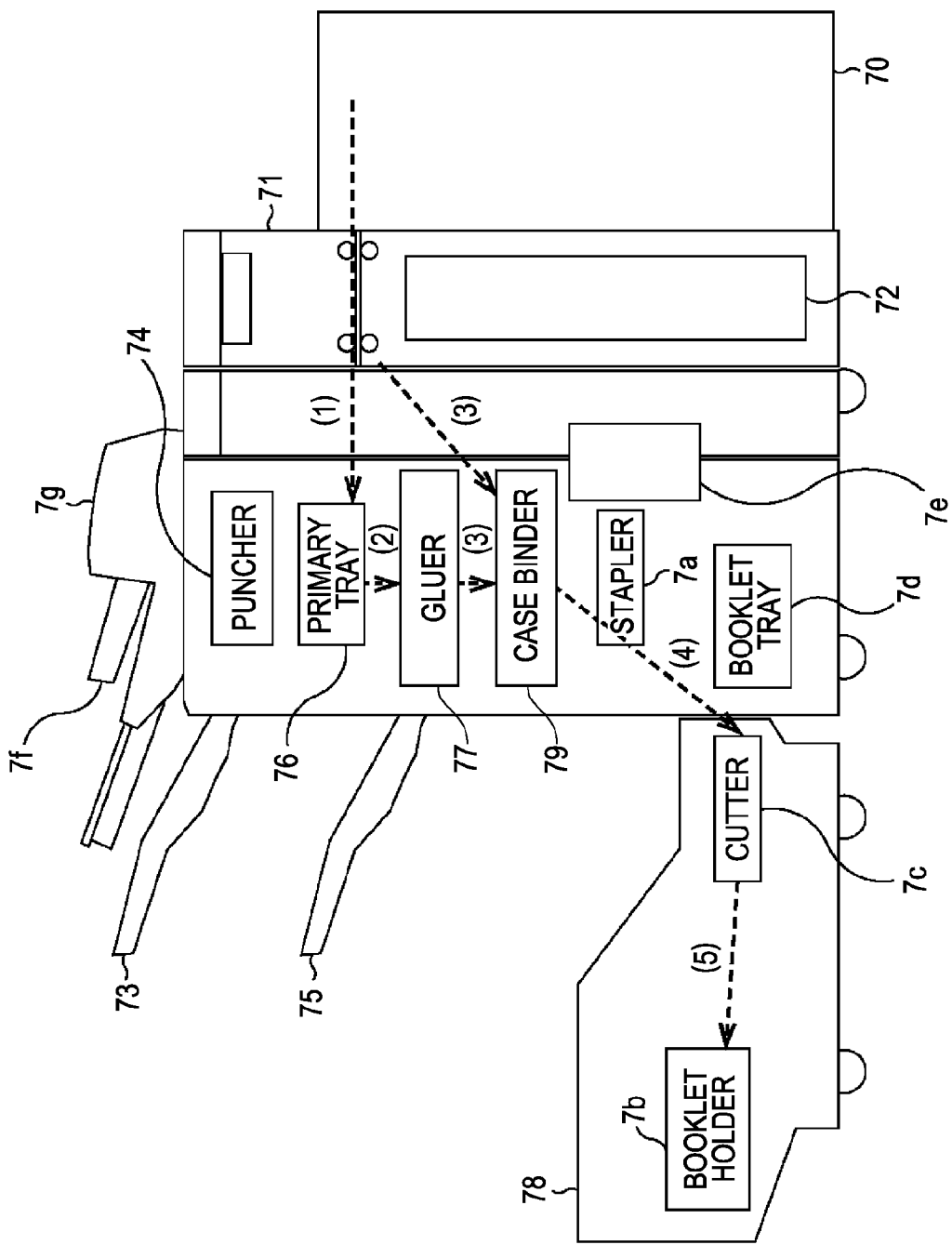
FIG. 7 illustrates an example of the structure of an in-line finisher apparatus according to the first exemplary embodiment of the present invention.

The conveying path of printed documents in the case binding in the post-processing device will now be described. FIG. 7 illustrates an example of the structure of an in-line finisher apparatus. As described above, according to the first exemplary embodiment of the present invention, the color MFP 37 is provided with the in-line finisher apparatus. Each functional part in the in-line finisher apparatus will now be described.

Printed documents discharged from a fixing unit in a printer body 70, which is a printer apparatus, are conveyed to an in-line finisher apparatus 71 when the in-line finisher apparatus 71 is connected to the printer body 70. The in-line finisher apparatus 71 is provided with a sample tray 73 and a stack tray 75. The in-line finisher apparatus 71 switches the discharge tray to the sample tray 73 or the stack tray 75 in accordance with the kind of a print job or the number of the discharged printed documents to discharge the printed sheets.

For example, if a stapling mode is set for the print job to be output, the in-line finisher apparatus 71 discharges the printed sheets to the stack tray 75 after the printed documents are stapled with a stapler 7a. The in-line finisher apparatus 71 further includes a Z folder 72 for folding each printed document into a Z-letter shape and a puncher 74 for boring two (or three) holes for filing in each printed document upstream of the two trays (the sample tray 73 and the stack tray 75). The corresponding processes are performed in accordance with the kind of the job. A saddle stitcher 7e in the in-line finisher apparatus 71 folds the printed documents at the center by binding the printed documents at two central portions and engaging the central portions of the printed documents with a roller in order to produce a booklet, such as a pamphlet (binding process). The printed documents subjected to the binding in the saddle stitcher 7e are discharged into a booklet tray 7d.

An inserter 7g of the in-line finisher apparatus 71 feeds each printed document set in an inserter tray 7f to any of the discharge trays including the stack tray 75 and the sample tray 73 not through the printer apparatus. This allows each printed document set in the inserter 7g to be inserted into the printed documents to be fed into the in-line finisher apparatus 71 (the printed documents printed in the printer body 70).

A trimmer 78 will now be described. The printed documents formed into the booklet (the pamphlet subjected to the saddle stitching) in the saddle stitcher 7e are conveyed to the trimmer 78. In trimmer 78, the booklet is fed by a roller by a predetermined length and is cut out by a cutter 7c by a predetermined length. This allows the multiple pages having irregular ends in the booklet to have aligned ends. The booklet having the aligned ends is stored in a booklet holder 7b.

A process in the case binding and the conveying path of printed documents in the case binding process will now be described with reference to FIG. 7.

The printed documents forming the body of the booklet are discharged from the printer body 70 and the printed documents corresponding to one booklet (the pages of the number corresponding to one booklet subjected to bookbinding printing) is held in a primary tray 76 (conveying path (1)). When the printed documents corresponding to one booklet is accumulated in the primary tray 76, the printed documents that are aligned are supplied to a gluer 77 (conveying path (2)) where glue is applied to the face corresponding to the back cover of the printed documents. Concurrently with the gluing, a front-cover document is discharged from the printer body 70 and is set in a case binder 79 (conveying path (3)). After the glue is applied to the printed documents and the front-cover document is set in the case binder 79, the glued printed documents are conveyed to the case binder 79 (conveying path (3)) where the glued printed documents are bound up with the front-cover document. The printed documents subjected to the case binding is conveyed to the cutter 7c (conveying path (4)) where the ends of the printed documents are cut to be aligned. Then, the printed documents are stored in the booklet holder 7b (conveying path (5)). It is a known fact that the documents output from the image processing apparatus are subjected to the bookbinding processes (the stapling, the punching, the saddle stitching, the case binding, and so on) in the post-processing devices.

Figure 8:
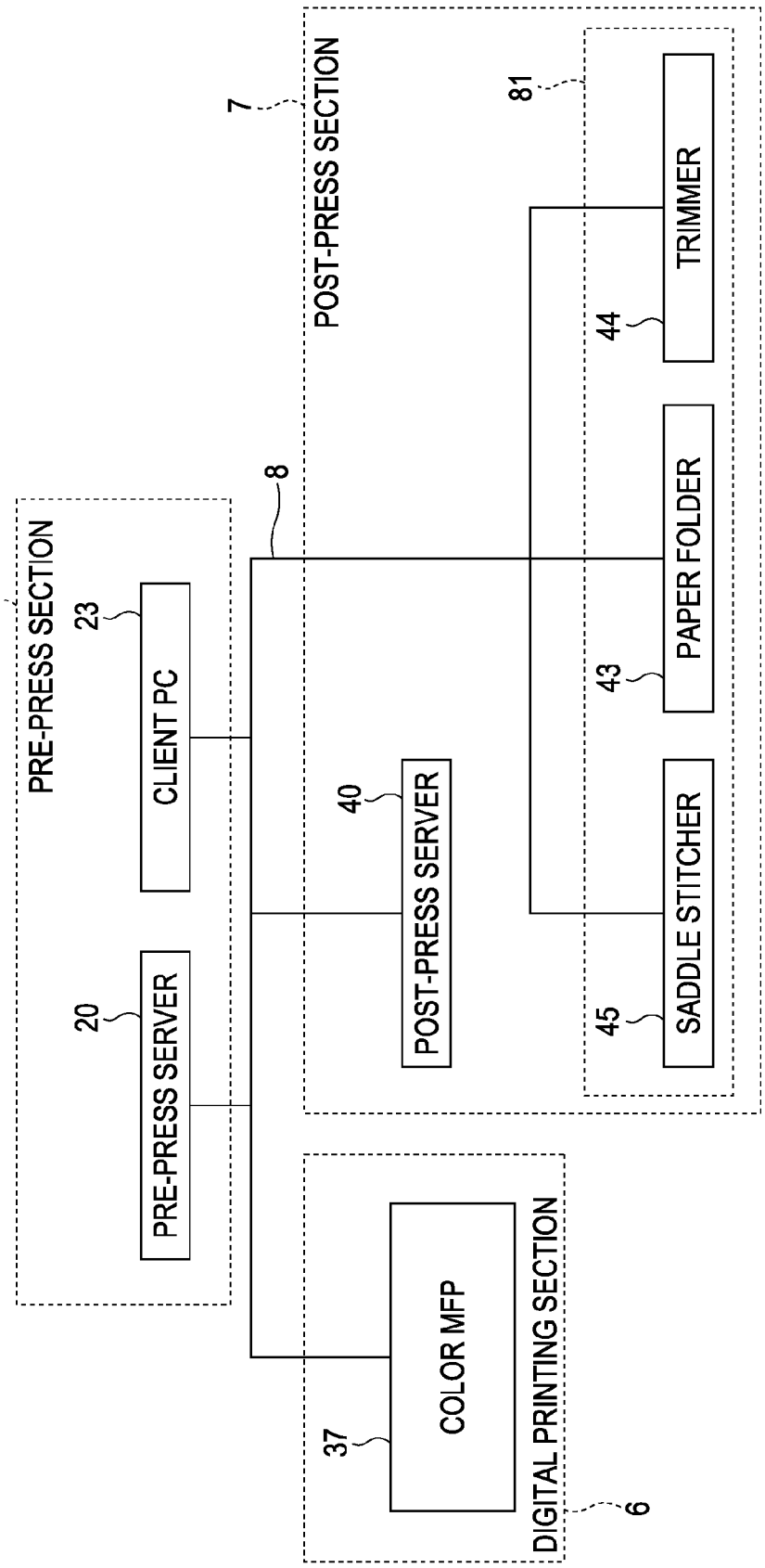
FIG. 8 illustrates a description of some particular components of the first exemplary embodiment in the POD system shown in FIG. 1 according to the first exemplary embodiment of the present invention.

FIG. 8 illustrates the description of some particular components of the first exemplary embodiment in the POD system shown in FIG. 1. The following description is given with reference to FIG. 8.

According to the first exemplary embodiment of the present invention, the pre-press section 5 in the POD system includes the pre-press server 20 and the client PC 23. The digital printing section 6 includes the color MFP 37. The color MFP 37 includes an MFP body that performs the processing from reception of a print job to output of a printed document on which drawing data corresponding to the print job is drawn in accordance with the instruction described in the JDF data transmitted from the pre-press server 20. The color MFP 37 receives the print job including both the JDF data and the drawing data to perform the printing process. Alternatively, the color MFP 37 may recognize a portion where the drawing data described in the JDF data is stored and may acquire the drawing data from the storage portion to perform the printing process.

The post-press section 7 includes the post-press server 40 and a near-line finisher 81 (including, for example, the paper folder 43, the trimmer 44, and the saddle stitcher 45). The post-press server 40 transmits the status of each device in the post-press section 7 to the pre-press server 20 and receives JDF data from the pre-press server 20. As described above, the devices including the pre-press server 20, the color MFP 37, and the post-press server 40 are connected to each other via the network 8, such as a LAN.

According to the first exemplary embodiment of the present invention, the pre-press server 20 manages the work flow in the entire POD system. In other words, the pre-press server 20 manages the processing schedule of print jobs in the entire POD system. Specifically, when JDF data is generated in the client PC 23, the pre-press server 20 manages information about the processing schedule of the JDF data. The pre-press server 20 transmits the JDF data to the digital printing section 6 and the post-press section 7 in accordance with the processing schedule information to instruct the digital printing section 6 and the post-press section 7 to start each print job. The pre-press server 20 receives information about the current processing status from the post-press section 7 or the post-press section 7. The pre-press server 20 receives a termination notification of each print job from the digital printing section 6 or the post-press section 7. The pre-press server 20 notifies the operator of the variety of information received in the above manner with a computer display, such as a cathode ray tube (CRT) display, connected to the client PC 23.

Figure 9:
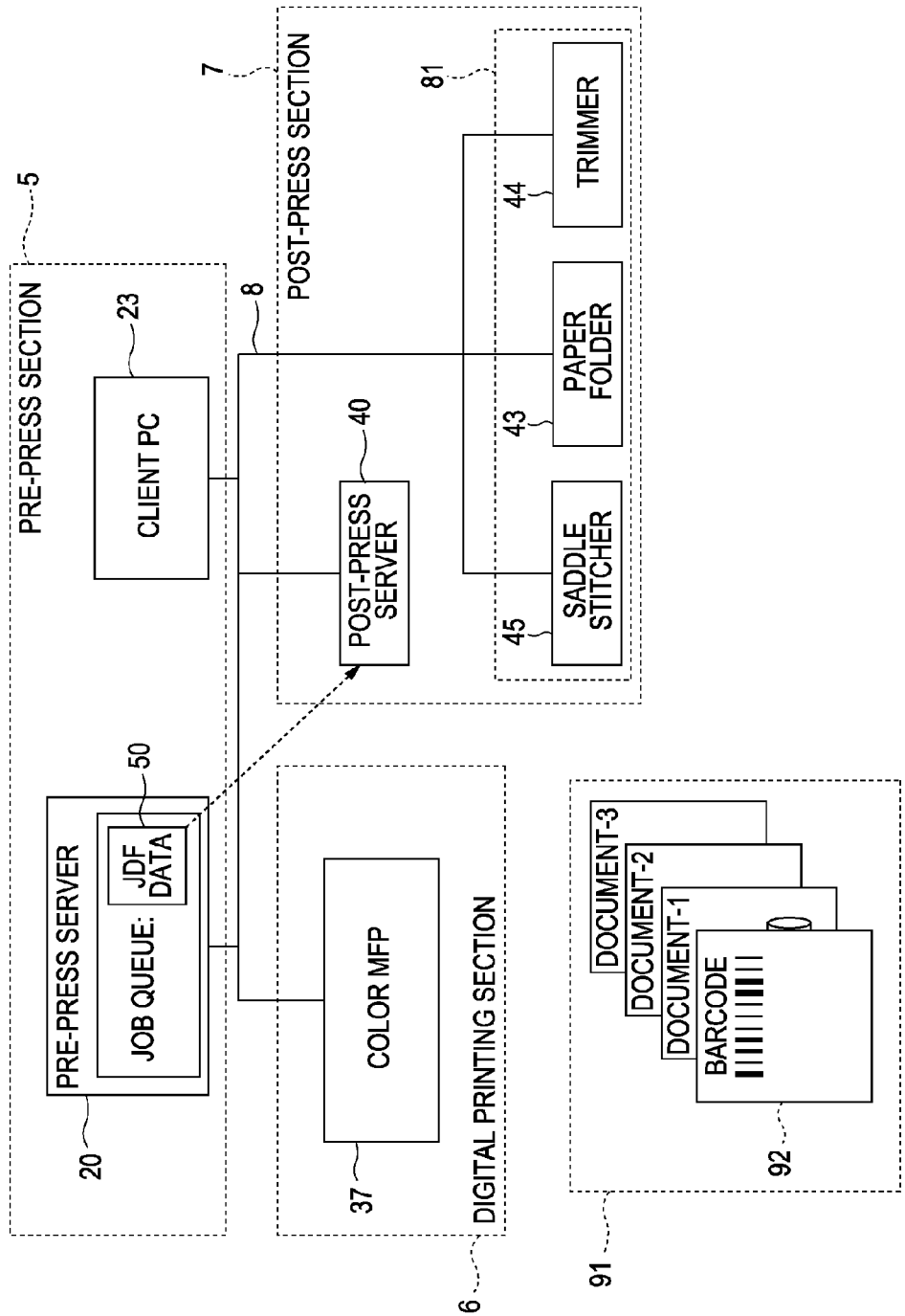
FIG. 9 conceptually illustrates an example of a process in which the post-press section receives a print job from the pre-press section according to the first exemplary embodiment of the present invention.

FIG. 9 conceptually illustrates an example of a process in which the post-press section 7 receives a print job from the pre-press section 5.

Referring to FIG. 9, the pre-press server 20 holds the JDF data 50 generated by the client PC 23 in accordance with an instruction from the operator in a job queue. The pre-press server 20 transmits the JDF data 50 set in the job queue to the post-press server 40 in order to cause the near-line finisher 81 to perform the post-processing. The JDF data 50 to be transmitted to the post-press server 40 will be described in detail below with reference to FIG. 10.

A printed document 91 is output from the color MFP 37. The near-line finisher 81 performs the finishing processes to the printed document 91. The printed document 91 includes a job ticket 92. The job ticket 92 is output at a position which is easily recognized by the operator, for example, at the top of the printed document 91. The job ticket 92 includes information indicating the JDF data 50 as identification information (barcode). In addition to the job ticket 92, the entity of the printed document based on the print content data and the JDF data 50 is output from the color MFP 37. The identification information (the barcode in FIG. 9) described in the job ticket 92 is used to associate the JDF data 50 transmitted to the post-press server 40 with the printed document 91 corresponding to the content indicated by the JDF data 50. Specifically, upon start of the processing in the near-line finisher 81, the operator causes the near-line finisher 81 to recognize the barcode described in the job ticket 92. The near-line finisher 81 associates the printed document 91 to be subjected to the post-processing with the JDF data 50 which the post-press server 40 has received from the pre-press server 20 based on the result of the recognition. Accordingly, it is sufficient for the operator to set the printed document in the near-line finisher 81 to cause the near-line finisher 81 to perform the post-processing based on the operational instruction described in the JDF data 50.

Figure 10A:
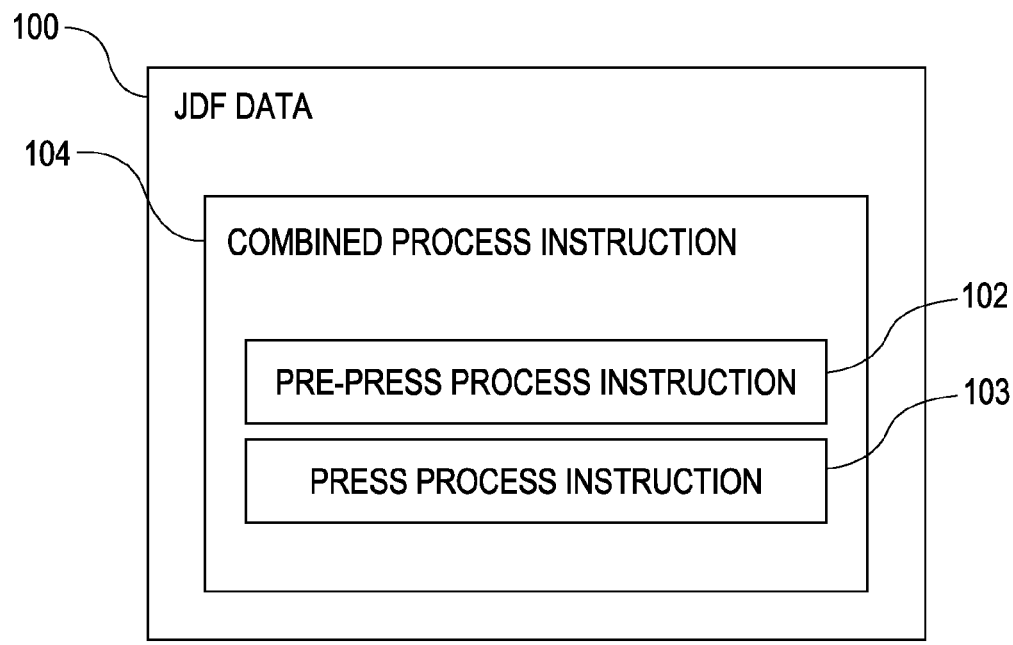
FIG. 10A shows an example of JDF data that is transmitted from a pre-press server to a color MFP and FIG. 10B shows an example of JDF data that is transmitted from the pre-press server to a post-press server, according to the first exemplary embodiment of the present invention.
Figure 10B:
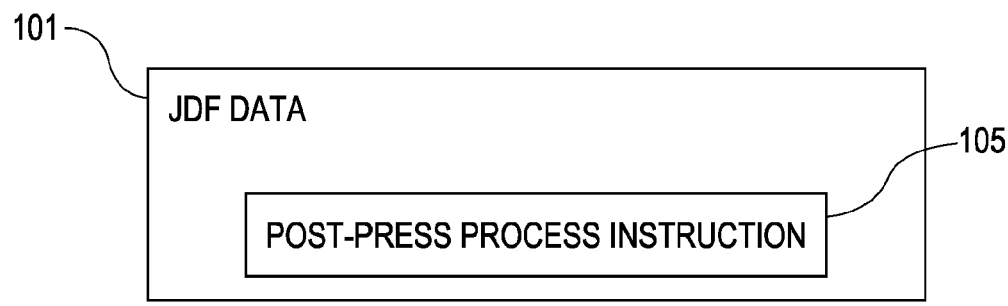

FIG. 10A shows an example of JDF data 100 that is transmitted from the pre-press server 20 to the color MFP 37. FIG. 10B shows an example of JDF data 101 that is transmitted from the pre-press server 20 to the post-press server 40.

Referring to FIG. 10A, a Pre-press process instruction 102 included in the JDF data 100 is used to execute the Pre-press process, and a Press process instruction 103 is used to execute the Press process. A Combined process instruction 104 includes the Pre-press process instruction 102 and the Press process instruction 103.

Referring to FIG. 10B, a Post-press process instruction 105 included in the JDF data 101 is used to execute the Post-press process. The instruction in the JDF data 101 is executed in the near-line finisher 81 through the post-press server 40. The post-press server 40 refers to the operational instruction described in the JDF data 101 to determine that the processing based on the Post-press process instruction 105 is to be executed in the near-line finisher 81.

Figure 11:
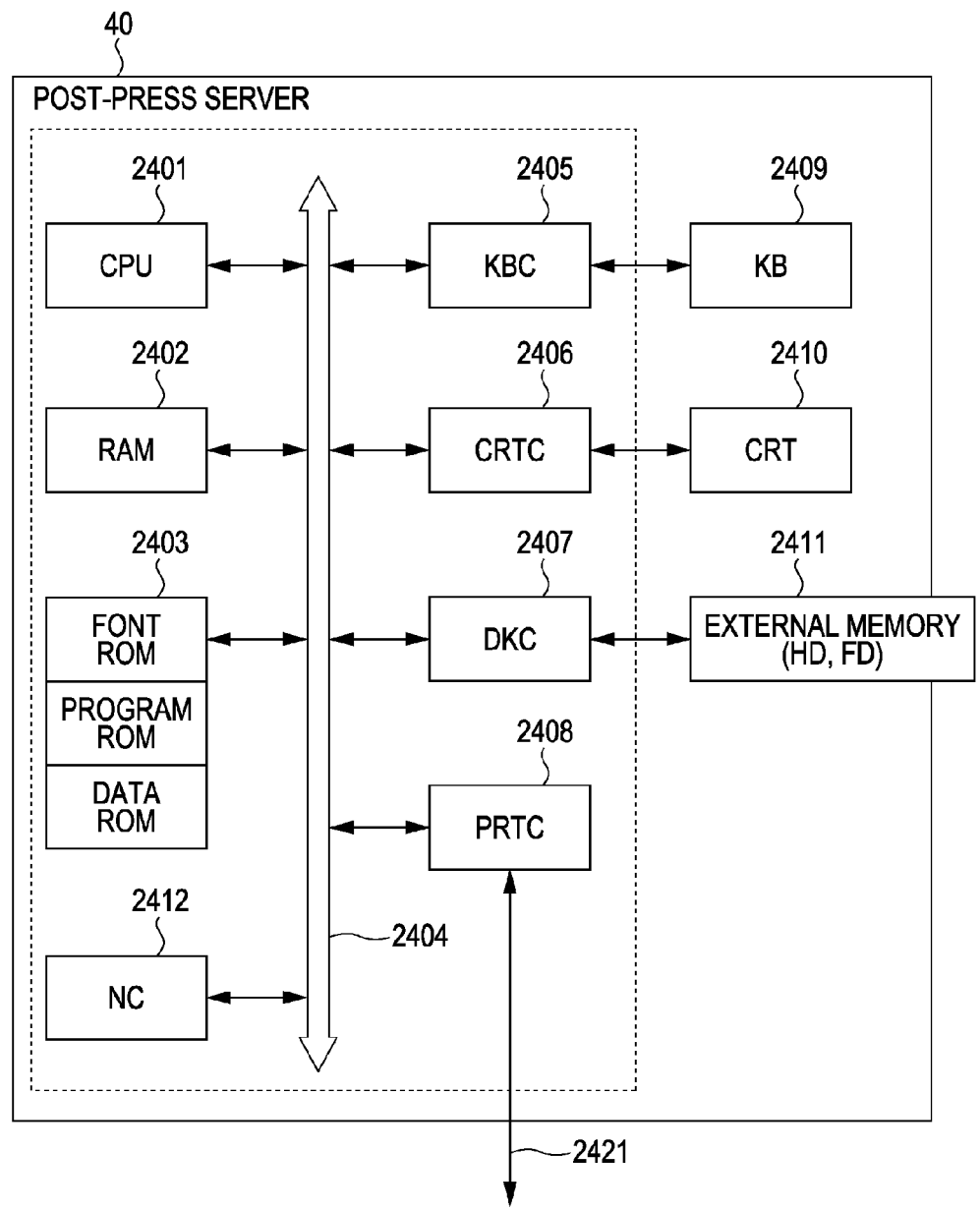
FIG. 11 is a block diagram showing an example of the hardware configuration of the post-press server according to the first exemplary embodiment of the present invention.

FIG. 11 is a block diagram showing an example of the hardware configuration of the post-press server 40 according to the first exemplary embodiment of the present invention. The pre-press server 20 and the client PC 23 basically each have the same hardware configuration as that of the post-press server 40 shown in FIG. 11. The post-press server 40 includes a central processing unit (CPU) 2401 that processes a document including graphics, images, texts, and tables (including table calculation) based on, for example, a document processing program (i.e., computer-executable program) stored in a read only memory (ROM) 2403 (i.e., computer readable storage medium) or an external memory 2411. In the post-press server 40, the CPU 2401 controls each device connected to a system bus 2404. For example, an operating system program, which is a control program for the CPU 2401, is stored in a program ROM in the ROM 2403 or the external memory 2411. For example, font data used in the document processing is stored in a font ROM in the ROM 2403 or the external memory 2411. A variety of data used in the document processing is stored in a data ROM in the ROM 2403 or the external memory 2411. A random access memory (RAM) 2402 functions as, for example, a main memory and a working area for the CPU 2401.

A keyboard controller (KBC) 2405 controls a key input with a keyboard (KB) 2409 or a pointing device (not shown). A CRT controller (CRTC) 2406 controls display in a CRT display (CRT) 2410. A disk controller (DKC) 2407 controls access to the external memory 2411, such as a hard disk (HD) or a flexible disk (FD), storing files. For example, a boot program, various applications, font data, user files, editing files, and a printer-control-command generating program (hereinafter referred to as a printer driver) are stored in the external memory 2411. A printer controller (PRTC) 2408 is connected to an external apparatus via a bi-directional interface 2421 to perform a process of controlling communication with the external apparatus. A network controller (NC) 2412 is connected to a network to perform a process of controlling communication with another device connected to the network.

The CPU 2401 is capable of What You See Is What You Get (WYSIWYG) on the CRT 2410 by rendering (rasterizing) outline fonts in a display information RAM set on the RAM 2402. In addition, the CPU 2401 opens various windows that are registered based on commands instructed with, for example, a mouse cursor (not shown) on the CPU 2401 to perform a variety of data processing. In order to perform printing, a user opens a window associated with the settings of the printing to make the settings for the external apparatus and to set a printing method for the printer driver including selection of a printing mode.

Figure 12:
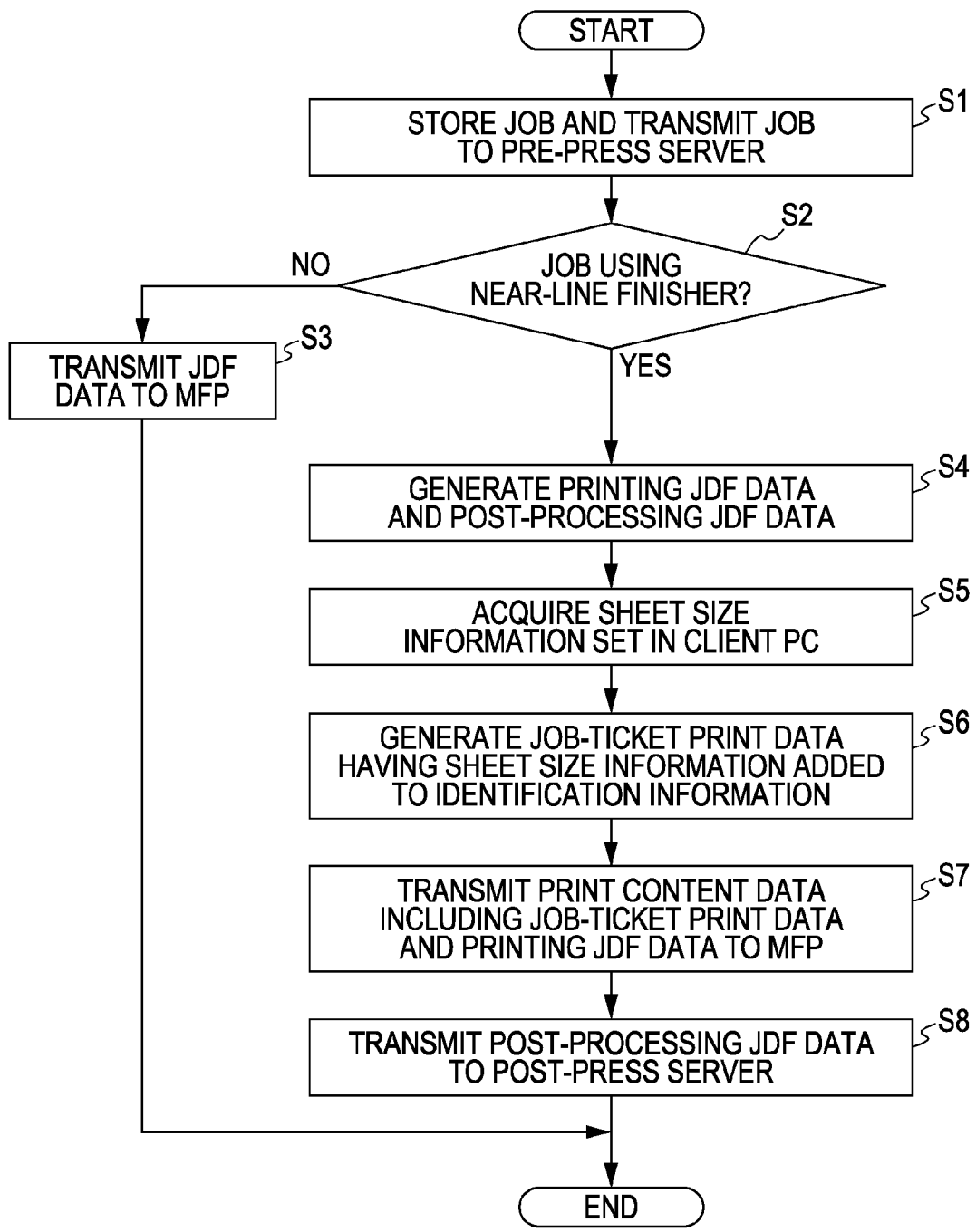
FIG. 12 is a flowchart showing an example of a process in which the pre-press server transmits JDF data and print content data to the color MFP and the post-press server according to the first exemplary embodiment of the present invention.

FIG. 12 is a flowchart showing an example of a process in which the pre-press server 20 transmits the JDF data 100, the JDF data 101, and print content data to the color MFP 37 and the post-press server 40. The steps in FIG. 12 are performed by the pre-press server 20 and the client PC 23 included in the pre-press section 5.

Referring to FIG. 12, in Step S1, the client PC 23 stores information about a job that is created and set by an operator and transmits the information to the pre-press server 20. The information about the job concerns, for example, imposition settings, sheets to be used, an output apparatus, printing process settings, and post-processing settings.

In Step S2, the pre-press server 20 determines whether a post-press setting indicating use of the near-line finisher 81 is included in the information about the job received in Step S1.

If the pre-press server 20 determines that the post-press setting indicating use of the near-line finisher 81 is not included in the information about the job received in Step S1 (NO in Step S2), the process goes to Step S3. In Step S3, the pre-press server 20 transmits the JDF data 100 for printing and the print content data to the color MFP 37. The color MFP 37 uses the print content data to be processed and the JDF data 100 to perform the printing process.

If the pre-press server 20 determines that the post-press setting indicating use of the near-line finisher 81 is included in the information about the job received in Step S1 (YES in Step S2), the process goes to Step S4. In Step S4, the pre-press server 20 generates the JDF data 100 for printing to be transmitted to the color MFP 37 and the JDF data 101 for post-processing to be transmitted to the post-press server 40 based on the information about the job.

In Step S5, the pre-press server 20 acquires sheet size information about the size of sheets used in the job, which is set by the operator on the client PC 23, from the information about the job received in Step S1.

In Step S6, the pre-press server 20 generates job-ticket print data for printing the job ticket 92 shown in FIG. 9 and adds the generated job-ticket print data to the print content data. The pre-press server 20 generates the job-ticket print data including the sheet size information acquired in Step S5.

In Step S7, the pre-press server 20 transmits the print content data including the job-ticket print data and the JDF data 100 for printing to the color MFP 37. As described above, the transmission of the JDF data 100 interpreted by the print job controller and the print content data to the MFP controller causes the processing in the color MFP 37 to be started. The identification information (barcode) in the print content data includes the identification (ID) number of the job, and the ID number of the job is associated with the ID number of the JDF data for post-processing.

In Step S8, the pre-press server 20 transmits the JDF data 101 for post-processing to the post-press server 40.

Figure 13:
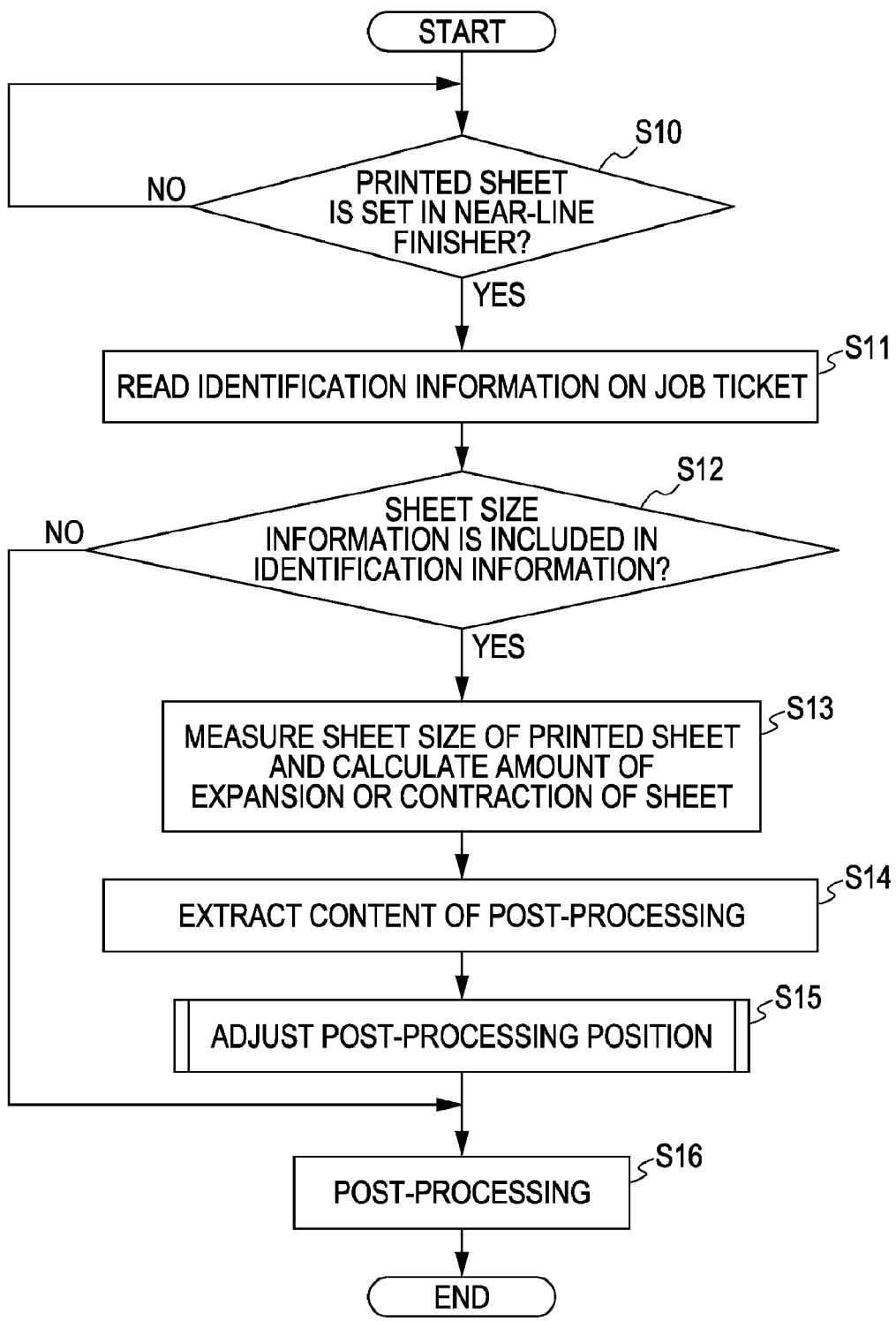
FIG. 13 is a flowchart showing an example of a process performed when a printed sheet printed in the color MFP is set in a near-line finisher according to the first exemplary embodiment of the present invention.

FIG. 13 is a flowchart showing an example of a process performed when a printed sheet (for example, the job ticket 92 in FIG. 9) printed in the color MFP 37 is set in the near-line finisher 81. The steps in FIG. 13 are performed by the post-press server 40 and the near-line finisher 81 included in the post-press section 7.

Referring to FIG. 13, in Step S10, the near-line finisher 81 detects whether the printed sheet printed in the color MFP 37 is conveyed by an operator and is set in the near-line finisher 81 for post-processing.

If the near-line finisher 81 does not detect that the printed sheet is set in the near-line finisher 81 (NO in Step S10), the process goes back to start. If the near-line finisher 81 detects that the printed sheet is set in the near-line finisher 81 (YES in Step S10), the process goes to Step S11. In Step S11, the near-line finisher 81 scans and reads the identification information (barcode) added to the job ticket 92 on the printed sheet. The post-press server 40 acquires the ID number of the job from the identification information.

In Step S12, the near-line finisher 81 determines whether the sheet size information is included in the identification information acquired in Step S11. If the near-line finisher 81 determines that the sheet size information is not included in the identification information acquired in Step S11 (NO in Step S12), the process goes to Step S16. In Step S16, the near-line finisher 81 performs the processing based on the JDF data 101 for post-processing transmitted from the post-press server 40.

If the near-line finisher 81 determines that the sheet size information is included in the identification information acquired in Step S11 (YES in Step S12), the process goes to Step S13. In Step S13, the near-line finisher 81 measures the sheet size of the printed sheet set in Step S10 and transmits the measured sheet size to the post-press server 40 along with the print size information included in the identification information. The post-press server 40 calculates (or derives) an amount of expansion or contraction from the two kinds of the sheet size information. The post-press server 40 can derive the amount of expansion or contraction in the vertical and horizontal directions of the sheet.

As described above, according to the first exemplary embodiment of the present invention, performing Step S11 realizes an example of a deriving unit.

In Step S14, the post-press server 40 selects the JDF data 101 for post-processing corresponding to the ID number read out in Step S11 from the list of the JDF data 101 for post-processing received from the pre-press server 20. Then, the post-press server 40 extracts the content of the post-processing from the JDF data 101 for post-processing. Upon reception of the JDF data 101 for post-processing from the pre-press server 20, the post-press server 40 adds information about the JDF data for post-processing to the list of the JDF data 101 for post-processing held in the post-press server 40. When the post-processing is finished in the near-line finisher 81, the post-press server 40 deletes the information about the JDF data for post-processing from the list of the JDF data 101 for post-processing held in the post-press server 40.

In Step S15, the post-press server 40 adjusts the post-processing position based on the amount of expansion or contraction calculated in Step S13 and the content of the post-processing extracted in Step S14. Then, the post-press server 40 overwrites the JDF data 101 for post-processing with the adjusted post-processing position and transmits the JDF data 101 for post-processing subjected to the overwriting to the near-line finisher 81. In Step S16, the near-line finisher 81 performs the processing based on the JDF data 101 in which the processing position is adjusted.

As described above, according to the first exemplary embodiment of the present invention, performing Step S15 realizes an example of a position changing unit.

Figure 14A:
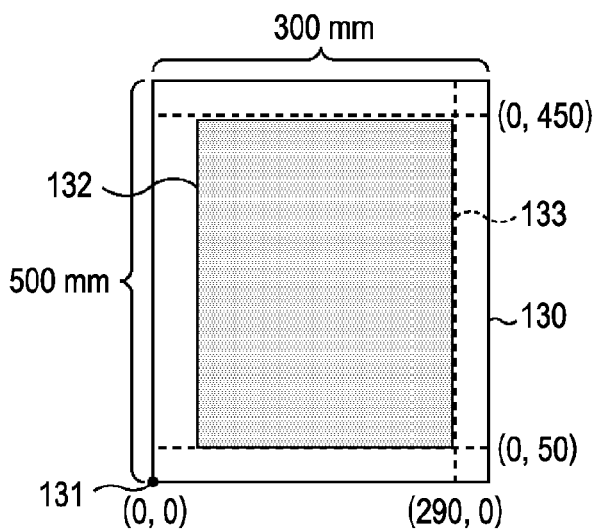
FIGS. 14A to 14C illustrate examples of how to adjust a post-processing position when three-side trimming is performed for a printed sheet according to the first exemplary embodiment of the present invention.
Figure 14B:
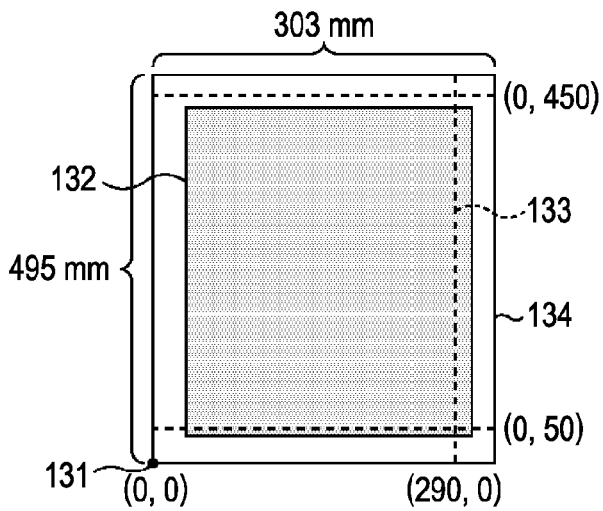
Figure 14C:
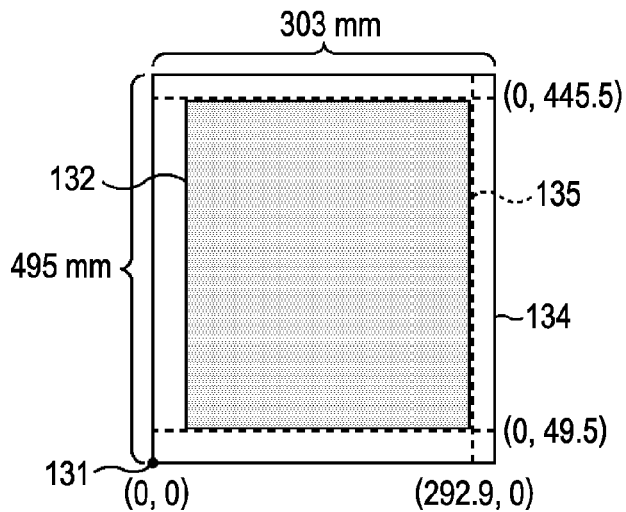

FIGS. 14A to 14C illustrate examples of how to adjust the post-processing position when three-side trimming is performed for a printed sheet. The adjustment process shown in FIGS. 14A to 14C is performed in Step S15 in FIG. 13.

Referring to FIG. 14A, reference numeral 130 denotes a printed sheet printed in the color MFP 37. The sheet 130 has a length of 500 mm and a width of a 300 mm. Reference numeral 131 denotes the origin of the sheet 130 and the origin 131 has a coordinate (0,0) ((horizontal coordinate, vertical coordinate)). Reference numeral 132 denotes a print area.

Reference numeral 133 denotes trimming positions where the trimming is performed. The vertical trimming is performed along a line 290 mm apart from the origin 131 and the horizontal trimming is performed along a line 50 mm apart from the origin 131 and along a line 450 mm apart from the origin 131. These coordinate parameters are described in the JDF data 101 for post-processing as trimming parameters.

Referring to FIG. 14B, reference numeral 134 denotes a printed sheet whose size is varied because the printed sheet is left. The sheet 134 has a length of 495 mm and a width of 303 mm. If the trimming parameters described in the JDF data 101 for post-processing (that is, the post-processing positions) are not adjusted, the trimming positions are shifted by an amount corresponding to the variation in the sheet size.

FIG. 14C illustrates the trimming positions after the trimming parameters are adjusted in Step S15 in FIG. 13. Since the trimming parameters are involved in both the horizontal direction and the vertical direction in the three-side trimming, the trimming positions are adjusted for every direction. The post-processing position after the positional adjustment is calculated according to Equation (1) by using the post-processing position set by the operator and the actual sheet size:

(Post-processing position after positional adjustment)=(Post-processing position set by operator)×(Actual sheet size)÷(Sheet size that is set)    (1)

In the example shown in FIG. 14C, the calculation according to Equation (1) indicated that the vertical trimming is performed along a line 292.9 mm apart from the origin 131 and the horizontal trimming is performed along a line 49.5 mm apart from the origin 131 and along a line 445.5 mm apart from the origin 131 (these trimming positions are denoted by a reference numeral 135).

Although the three-side trimming is exemplified as the post-processing, the present invention is not restricted to the three-side trimming as the post-processing and is applicable to another post-processing. Equation (1) is an example of the method of calculating the post-processing position after the positional adjustment by using the amount of expansion or contraction of the sheet, and the method of calculating the post-processing position after the positional adjustment is not restricted to use of Equation (1).

FIG. 15 is a flowchart showing an example of a process of adjusting the post-processing position in a "job including post-processing" using multiple kinds of sheets. The adjustment process in FIG. 15 is performed in, for example, in Step S15 in FIG. 13. The steps in FIG. 15 are performed by the post-press server 40 and the near-line finisher 81 included in the post-press section 7. In the example in FIG. 15, a process of adjusting the trimming position in the case binding is exemplified as the process of adjusting the post-processing position. In the case binding, after glue is applied to the body covered with the front cover, the trimming is performed to align the binding width. Since the front cover is different from the body in the kind and/or size of the sheets in the case binding, multiple pieces of sheet information are to be set.

Referring to FIG. 15, in Step S20, the post-press server 40 acquires information about the sheet sizes of the front cover and the body specified in the JDF data 101 for post-processing. In Step S21, the post-press server 40 determines which has larger size in the vertical direction and in the horizontal direction based on the sheet size information acquired in Step S20. If the post-press server 40 determines that the body has a larger size than that of the front cover (BODY in Step S21), the process goes to Step S22. If the post-press server 40 determines that the front cover has a larger size than that of the body (COVER in Step S21), the process goes to Step S24.

Since the body has a larger size than that of the front cover in Step S22, trimming in accordance with the amount of expansion or contraction of the sheet size of the front cover, which has a smaller size, is to be performed. Accordingly, in Step S22, the near-line finisher 81 measures the actual sheet size of the front cover.

In Step S23, the post-press server 40 calculates the amount of expansion or contraction of the front cover from the difference between the sheet size of the front cover set in the JDF data 101 and the sheet size of the front cover actually measured. In Step S26, the near-line finisher 81 adjusts the trimming position based on the amount of expansion or contraction of the front cover.

Since the front cover has a larger size than that of the body in Step S24, trimming in accordance with the amount of expansion or contraction of the sheet size of the body, which has a smaller size, is to be performed. Accordingly, in Step S24, the near-line finisher 81 measures the actual sheet size of the body.

In Step S25, the post-press server 40 calculates the amount of expansion or contraction of the body from the difference between the sheet size of the body set in the JDF data 101 and the sheet size of the body actually measured. In Step S26, the near-line finisher 81 adjusts the trimming position based on the amount of expansion or contraction of the body.

As described above, according to the first exemplary embodiment of the present invention, performing Steps S23 and S25 realizes an example of the deriving unit and performing Step S26 realizes an example of the position changing unit.

If the front cover is vertically longer than the body and the body is horizontally wider than the front cover, for example, Steps S24 and S25 may be performed in the vertical direction and Steps S22 and S23 may be performed in the horizontal direction.

When the flowchart shown in FIG. 15 is performed in Step S15 in FIG. 13, Step S13 in FIG. 13 may not be performed.

Figure 16A:
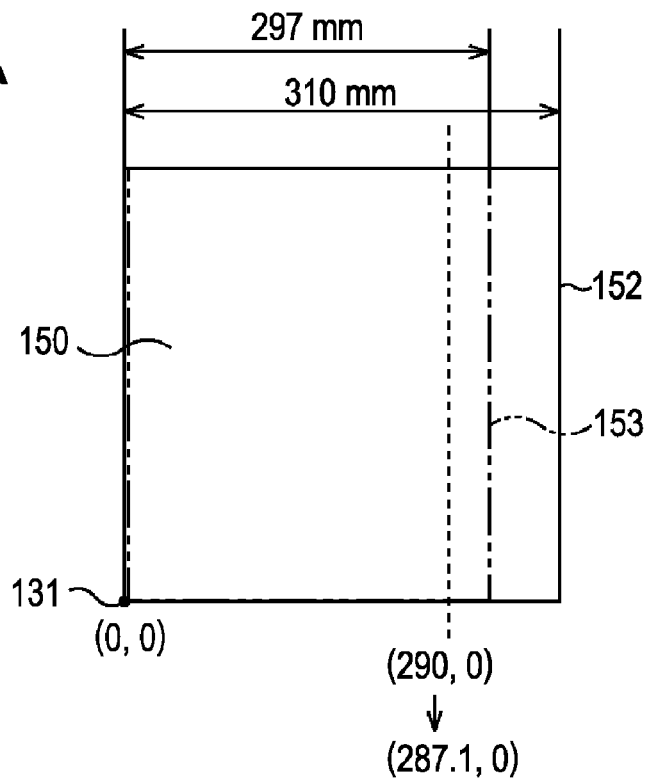
FIGS. 16A and 16B illustrate examples of how to adjust the post-processing position when multiple kinds of sheets are used according to the first exemplary embodiment of the present invention.
Figure 16B:
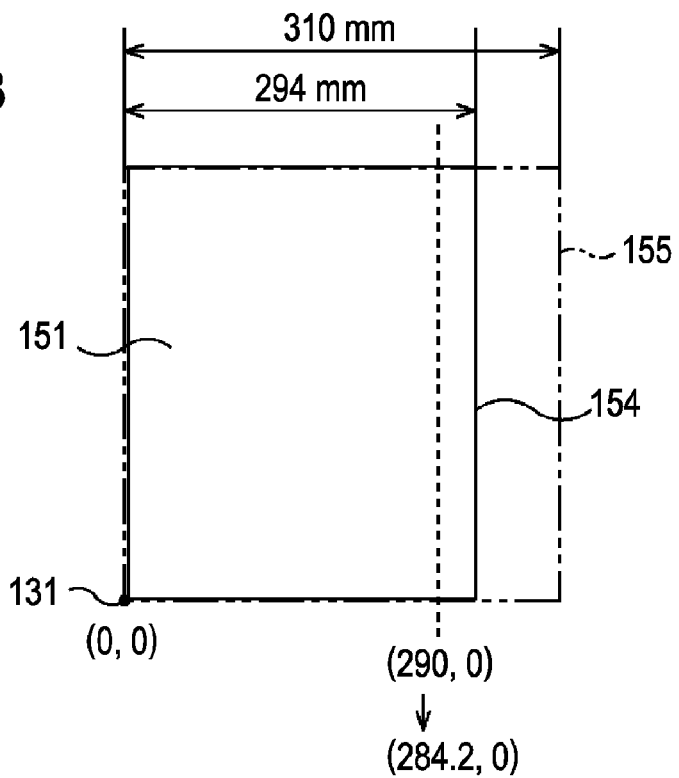

FIGS. 16A and 16B illustrate examples of how to adjust the post-processing position when multiple kinds of sheets are used. A state in which glue is applied to the front cover and the body before the trimming is performed in the case binding is shown in FIGS. 16A and 16B. The adjustment process in FIGS. 16A and 16B is realized by the flowchart shown in FIG. 15.

Referring to FIG. 16A, in an output 150 subjected to the case binding, the width of a front cover 152 is larger than that of a body 153. It is assumed here that the measured width of the front cover 152 is 310 mm and the measured width of the body 153 is 297 mm and that the trimming is specified along a line 290 mm horizontally apart from the origin 131. In this case, since the width of the front cover 152 is larger than the width of the body 153, the trimming position is adjusted based on the amount of expansion or contraction of the sheet of the body 153. For example, if the width of the specified body 153 (the sheet of the body before the expansion or contraction) is 300 mm, the horizontal trimming position is shifted to a position 287.1 mm apart from the origin 131 according to the above Equation (1).

Referring to FIG. 16B, in an output 151 subjected to the case binding, the width of a body 155 is larger than that of a front cover 154. It is assumed here that the measured width of the front cover 154 is 294 mm and the measured width of the body 155 is 310 mm and that the trimming is specified along a line 290 mm horizontally apart from the origin 131, as in the example in FIG. 16A. In this case, since the width of the body 155 is larger than the width of the front cover 154, the trimming position is adjusted based on the amount of expansion or contraction of the sheet of the front cover 154. For example, if the width of the specified front cover 154 (the sheet of the front cover before the expansion or contraction) is 300 mm, the horizontal trimming position is shifted to a position 284.2 mm apart from the origin 131 according to the above Equation (1).

As described above, according to the first exemplary embodiment of the present invention, the amount of expansion or contraction of the sheet is calculated from the sheet size before the printing process and the sheet size after the printing process to adjust (change) the post-processing position on the sheet based on the calculated amount of expansion or contraction. Accordingly, even if the sheet size is varied from the normal sheet size before the printing because of the image forming process in the color MFP 37 or the printed sheets that are left, the post-processing position can be automatically adjusted in accordance with the variation. Consequently, it is possible to reduce the shift in the post-processing position due to the variation in the sheet size.

In addition, since the method of adjusting the post-processing position is determined from the content of the specified post-processing, the post-processing position can be adjusted in accordance with the variety of content of the post-processing. For example, even in a special job producing outputs including multiple kinds of sheets, as in the case binding, it is possible to adjust the post-processing position based on the smallest sheet.

Although the method of adjusting the post-processing position is determined in accordance with the content of the specified post-processing in the first exemplary embodiment, the present invention is not restricted to this method. For example, the method of adjusting the post-processing position may be determined in accordance with the sheet direction involved in a post-processing parameter indicating the content of the post-processing, in addition to (or instead of) the content of the post-processing.

According to the first exemplary embodiment, when the trimming is performed after holes are bored in the sheets in the post-processing, the trimming position is to be adjusted so that the punching is performed at constant positions even with the expansion or contraction. This is because the expansion or contraction of the sheets can cause the margin for punching to be varied in size to cause the sheets not to be aligned when the sheets are filed in another file. For example, it is assumed that, when the vertical trimming along a line 10 mm apart from the left ends of the sheets having a width of 300 mm is specified after the punching at positions 20 mm apart from the left ends of the sheets, the width of the sheets is contracted to 297 mm. In this case, the adjustment of the post-processing position based on the amount of expansion or contraction of the sheets causes the punching to be performed at positions 19.8 mm apart from the left ends of the sheets and causes the vertical trimming to be performed along a line 9.9 mm apart from the left ends of the sheets, according to Equation (1), thus decreasing the margin by 0.1 mm. Accordingly, the trimming position is adjusted to a position 10 mm apart from the left ends of the sheets so that the same margin as that before the post-processing position is adjusted is ensured.

The sheet size information is included in the job ticket 92 and the adjustment of the post-processing position is constantly performed if the sheets are expanded or contracted in the first exemplary embodiment. However, the adjustment of the post-processing position may not be performed if a certain condition is satisfied even in such a case. For example, the post-processing position is not to be adjusted when the folding position of the front cover is set in the case binding because the thickness of the body is not varied. In addition, the post-processing position may not be adjusted in the punching. However, since no adjustment of the post-processing position can cause an image to be overlapped with the punching position, a user is to determine whether the post-processing position is adjusted. When the punching is performed, the trimming position may be adjusted in the above manner so that the margin does not varied in size.

A second exemplary embodiment of the present invention will now be described. The post-processing position is adjusted in consideration of the amount of expansion or contraction of the sheets in the first exemplary embodiment described above. As a result, even if the size of the sheets is varied due to the image forming process or the sheets that are left, the post-processing position can be automatically adjusted in accordance with the variation in the size of the sheets. This answers the purpose of trimming the sheets at the boundary between image areas or at a certain position even if the sheets are expanded or contracted. However, to set the post-processing position at the boundary between an image area and a blank area or to fold the sheets at the center of an image, the post-processing position in accordance with the variation in the size of the sheets is to be changed and, in such a case, the finished sheet size is varied. There are cases in which, even if the sheets are expanded or contracted to vary the size of the sheets, outputs having the same size as that before the size of the sheets is varied are obtained depending on the purpose of the user.

According to the second exemplary embodiment of the present invention, the post-processing position is readjusted so that a finished sheet size is achieved after the post-processing position is adjusted to produce outputs keeping the initial sheet size even if the sheets are expanded or contracted. In other words, the process of readjusting the post-processing position is added to the first exemplary embodiment in the second exemplary embodiment. Accordingly, the same reference numerals shown in FIGS. 1 to 16 are used in the second exemplary embodiment to identify the same components in the first exemplary embodiment. A detailed description of such components is omitted herein.

Figure 17:
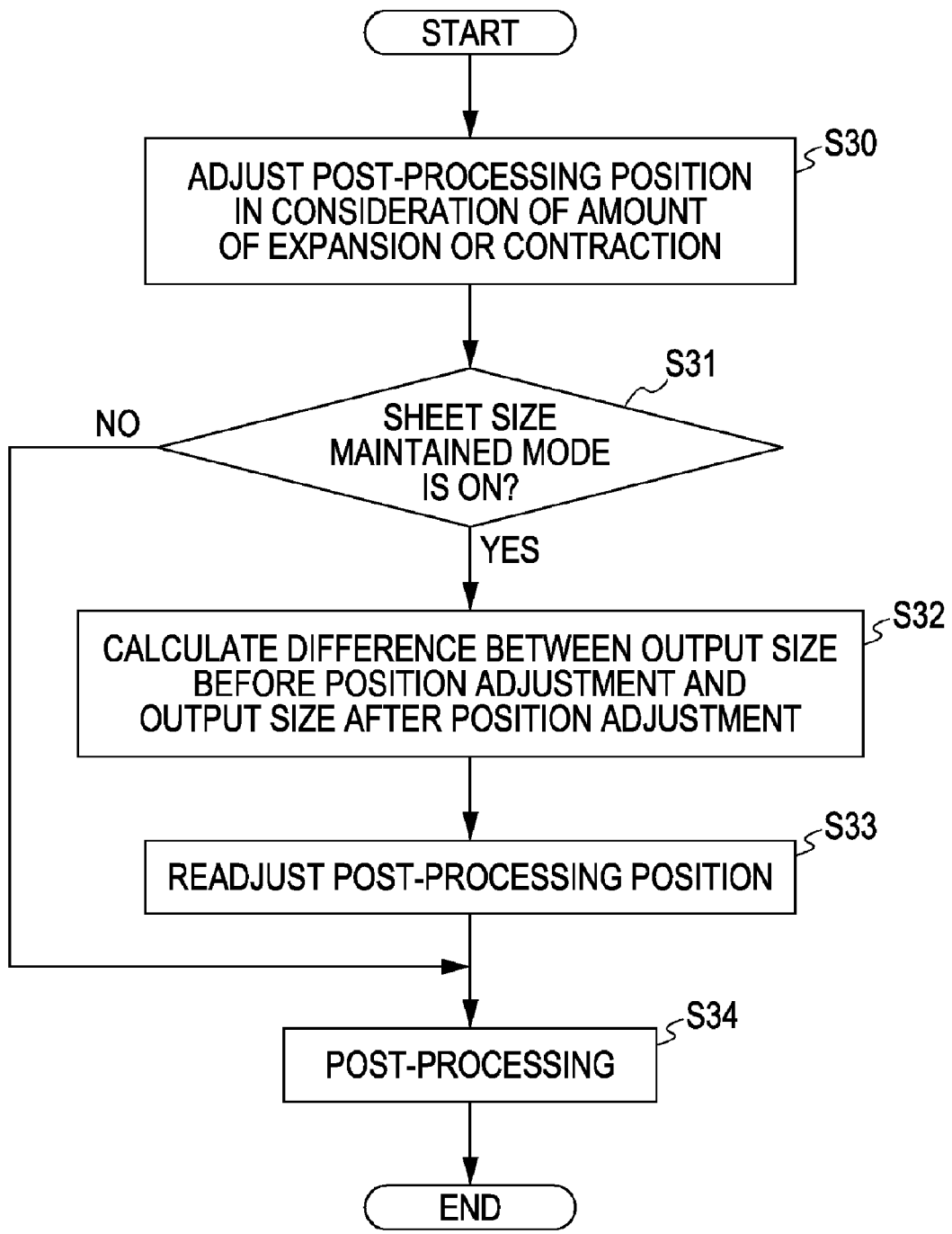
FIG. 17 is a flowchart showing an example of a process of adjusting the post-processing position in consideration of maintenance of a finished sheet size according to a second exemplary embodiment of the present invention.

FIG. 17 is a flowchart showing an example of a process of adjusting the post-processing position in consideration of maintenance of the finished sheet size according to the second exemplary embodiment of the present invention. The steps in the flowchart in FIG. 17 are performed by the post-press server 40 and the near-line finisher 81 included in the post-press section 7. Since the pre-press server 20 performs processing similar to the first exemplary embodiment in Steps S2 to S8 in FIG. 12, a detailed description of the steps is omitted herein. However, the pre-press server 20 is to perform the following processing in Step S1. Specifically, a process of receiving information indicating that a user has selected a mode in which the post-processing position is adjusted in consideration of maintenance of the finished sheet size on the user interface of the client PC 23 from the client PC 23 or the pre-press server 20 is to be performed. Also, the pre-press server 20 is to transmit information indicating which mode is selected in the client PC 23 to the post-press server 40. However, the transmission of the information may be performed in any method. The processing corresponding to Step S1 in FIG. 12 will be described below with reference to FIG. 19.

Referring to FIG. 17, in Step S30, the post-press server 40 adjusts the post-processing position by a process similar to the process described above with reference to the flowchart in FIG. 13 (Steps S10 to S15 (specifically, for example, FIGS. 14A to 16B)). However, the post-press server 40 does not overwrite the JDF data 101 for post-processing with the content of the adjustment of the post-processing position and does not transmit a post-processing instruction to the near-line finisher 81.

In Step S31, the post-press server 40 determines whether the adjustment mode for the post-processing position is set to a mode in which the post-processing position is adjusted in consideration of maintenance of the finished sheet size (a sheet size maintained mode). As described above, this setting is made with the client PC 23. If the post-press server 40 determines that the adjustment mode for the post-processing position is set to the sheet size maintained mode (YES in Step S31), the process goes to Step S32.

If the post-press server 40 determines that the adjustment mode for the post-processing position is not set to the sheet size maintained mode (NO in Step S31), the process skips Steps S32 and S33 and goes to Step S34. In Step S34, the post-press server 40 overwrites the JDF data 101 for post-processing with the content of the adjustment in Step S30 and transmits the post-processing instruction to the near-line finisher 81. The near-line finisher 81 executes the post-processing instruction for the job subjected to the adjustment of the post-processing position.

In Step S32, the post-press server 40 calculates the difference in the size of outputs (the sheet size) between before the post-processing position is adjusted and after the post-processing position is adjusted. This calculation shows how much a "finished sheet size" set by the user on the client PC 23 differs from the finished sheet size after the adjustment of the post-processing position.

In Step S33, the post-press server 40 readjusts the post-processing position by using the difference calculated in Step S32. In Step S34, the post-press server 40 overwrites the JDF data 101 for post-processing with the content of the readjustment in Step S33 and transmits the post-processing instruction to the near-line finisher 81. The near-line finisher 81 executes the post-processing instruction for the job subjected to the adjustment of the post-processing position.

Figure 18A:
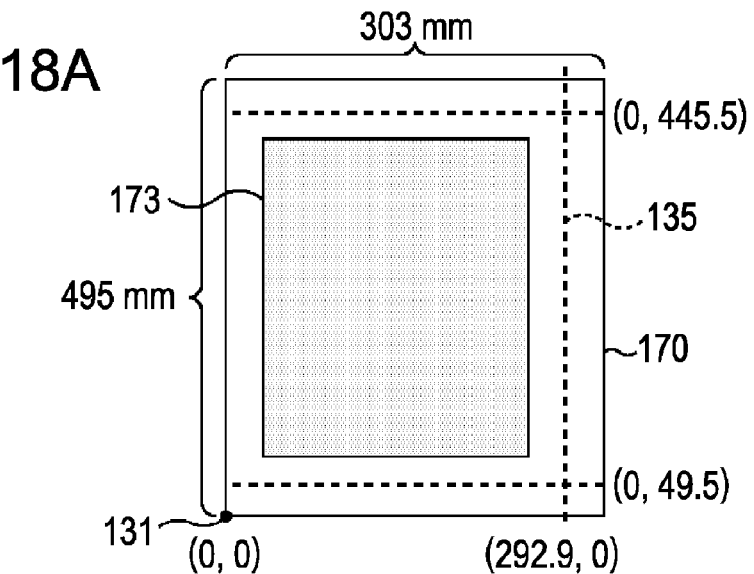
FIGS. 18A and 18B illustrate examples of how to readjust the post-processing position according to the second exemplary embodiment of the present invention.
Figure 18B:
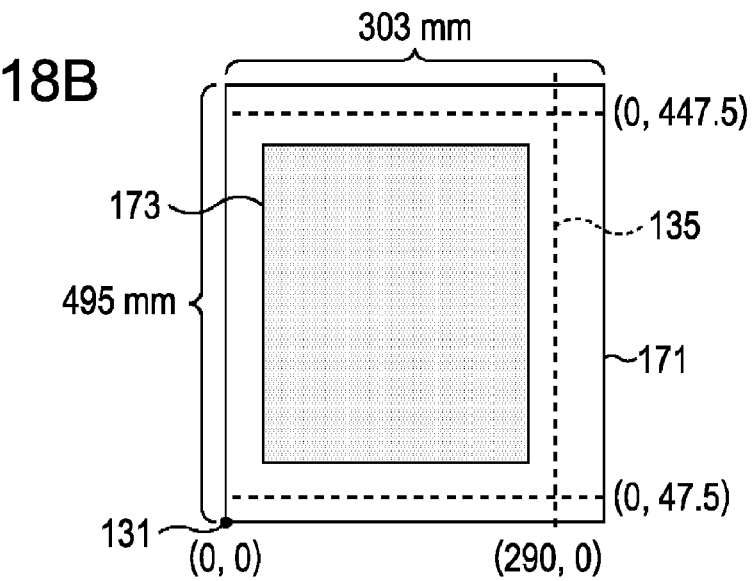

FIGS. 18A and 18B illustrate examples of how to readjust the post-processing position (Step S33 in FIG. 17). The readjustment process in FIGS. 18A and 18B are performed in accordance with the flowchart shown in FIG. 17. The same sheet, trimming positions, and amount of expansion or contraction as in FIGS. 14A and 14B are used in the examples in FIGS. 18A and 18B.

In the example in FIG. 18A, the trimming position that has been adjusted in consideration of the amount of expansion or contraction of the sheet in Step S30 in FIG. 17 is shown on a sheet 170. The state in FIG. 18A is equal to that in FIG. 14C. However, an image area 173 in FIGS. 18A and 18B is different from the image area 132 in FIGS. 14A to 14C. Comparison between the sheet 170 and the sheet 130 shows that the length 400 mm is varied to a length of 396 mm and that the width 290 mm is varied to a width of 292.9 mm.

In the example in FIG. 18B, the trimming position that has been readjusted in consideration of maintenance of the finished sheet size is shown on a sheet 171.

The difference in the sheet size between before the post-processing position is adjusted and after the post-processing position is adjusted is calculated in Step S32 in FIG. 17. In the example in FIG. 18A, the length is decreased by 4 mm and the width is increased by 2.9 mm. Since the two horizontal trimming positions exist, each of the horizontal trimming positions is moved outward by 2 mm in Step S33 in FIG. 17. In contrast, since only one vertical trimming position exists, the vertical trimming position is moved in the negative position (toward the origin 131) by 2.9 mm. As a result, it is possible to prevent the finished sheet size of the outputs from varying due to the effect of the expansion or contraction of the sheet.

Figure 19:
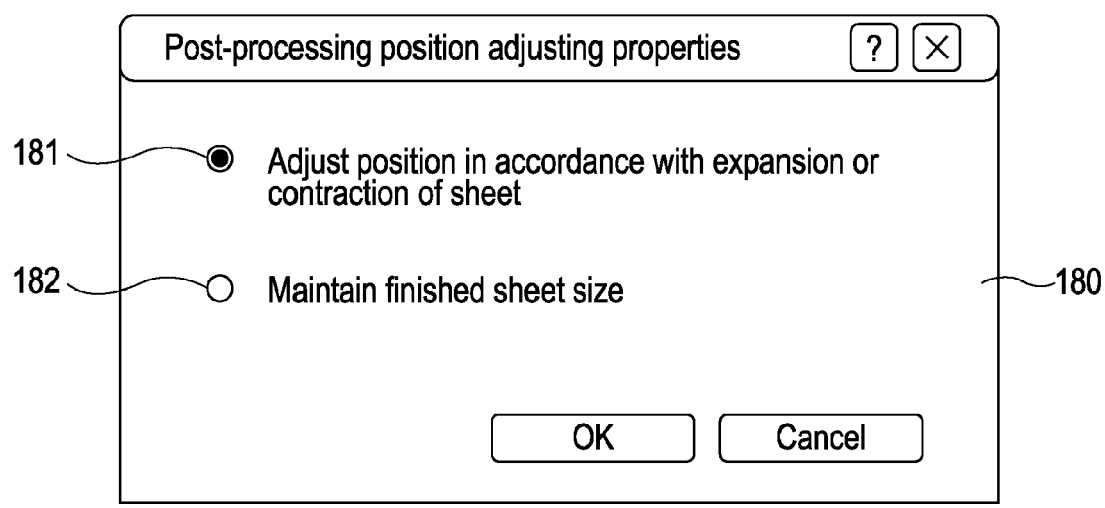
FIG. 19 illustrates an example of a user interface screen used for selecting a mode (a sheet size maintained mode) in which the post-processing position is adjusted in consideration of maintenance of the finished sheet size according to the second exemplary embodiment of the present invention.

FIG. 19 illustrates an example of a user interface screen used for selecting the mode (the sheet size maintained mode) in which the post-processing position is adjusted in consideration of maintenance of the finished sheet size. Referring to FIG. 19, a user interface screen 180 is a property screen in adjustment of the post-processing position. The user interface screen 180 is displayed in the display of the client PC 23 when the operator sets a job including the post-processing by the near-line finisher 81. The user interface screen 180 includes items 181 and 182 and the operator selects either of the items 181 and 182.

The item 181 is selected when the post-processing position is adjusted in accordance with the expansion or contraction of the sheet without considering the finished sheet size. The operator selects the item 181 when the operator wants to perform the post-processing by the method according to the first exemplary embodiment.

The item 182 is different from the item 181 and is selected when the state in which the finished sheet size is also expanded or contracted in accordance with the expansion or contraction of the sheet is avoided to adjust the post-processing position so that the finished sheet size is equal to that before the expansion of contraction. The operator selects the item 182 when the operator wants to perform the post-processing in the sheet size maintained mode described in the second exemplary embodiment.

As described above, according to the second exemplary embodiment, when the sheet size maintained mode is selected by the operator, the post-processing position is adjusted in consideration of the amount of expansion or contraction of the sheet and the difference in the sheet size between before the post-processing position is adjusted and after the post-processing position is adjusted is calculated. Then, the post-processing position is readjusted so that the sheet size after the post-processing is equal to that before the expansion or contraction based on the calculated difference in the sheet size. Accordingly, even if the sheet size is varied due to the image processing in the color MFP 37 or the sheets that are left, the post-processing position can be automatically adjusted without varying the finished sheet size from the initial size. Consequently, it is possible to meet the needs of the user who wants to perform the post-processing in order to obtain the sheets having the same size as that before the expansion or contraction.

In addition, the operator selectively adjusts the post-processing position in accordance with the expansion or contraction of the sheets without considering the finished sheet size or adjusts the post-processing position so that the finished sheet size is equal to that before the expansion or contraction in the second exemplary embodiment. Accordingly, it is possible to more flexibly meet the needs of the user.

OTHER MODIFICATIONS

The three kinds of processes: the Pre-press process instruction group 52, the Press process instruction group 53, and the Post-press process instruction group 54 are recorded in the JDF data 50 in the above exemplary embodiments of the present invention. However, other kinds of operational processes may be recorded in the JDF data 50. In addition, multiple operational processes, such as color conversion and imposition, may be recorded in the Pre-press process instruction group 52 as internal processes. The same applies to the Press process instruction group 53 and the Post-press process instruction group 54.

The process of adding the sheet size information to the identification information of the job ticket 92 is not restricted to the manner described in Step S6 in FIG. 12 and the sheet size information may be transmitted to the post-press server 40 in another manner.

When a job is reprinted, a method in which the adjustment of the post-processing position is omitted may be adopted.

For example, the post-press server 40 associates the JDF data before adjusting the post-processing position and the JDF data after adjusting the post-processing position (including the JDF data after readjusting the post-processing position in the second exemplary embodiment) with the printing device and stores the JDF data resulting from the association as job data. Then, the post-press server 40 determines whether the reprinting of the job is performed by the same device as that in the previous printing based on the JDF data transmitted from the pre-press server 20 and the job data. If the post-press server 40 determines that the reprinting of the job is performed by the same device as that in the previous printing, the post-press server 40 reads out the JDF data after adjusting the post-processing position and transmits the readout JDF data to the near-line finisher 81. If the post-press server 40 determines that the reprinting of the job is not performed by the same device as that in the previous printing, the post-press server 40 may transmit the JDF data in which the post-processing position is readjusted to the near-line finisher 81 or may transmit the JDF data in which the post-processing position is not adjusted to the near-line finisher 81.

Alternatively, the following method in which the adjustment of the post-processing position is omitted may be adopted.

For example, the post-press server 40 stores print condition information about a job that is subjected to printing in association with the JDF data after adjusting the post-processing position (including the JDF data after readjusting the post-processing position in the second exemplary embodiment). The print condition information depends on the expansion or contraction of the sheets and includes, for example, the brand name of the sheets, the sheet size, and device information. If the JDF data transmitted from the pre-press server 20 is based on the same condition as that in the print condition information, the post-press server 40 transmits the JDF data associated with the print condition information to the near-line finisher 81.

According to the exemplary embodiments of the present invention, even if the sheet size is varied from the normal sheet size before the printing due to the image forming process or the sheets that are left, the post-processing position can be automatically adjusted in accordance with the variation in the sheet size. Accordingly, it is possible to reduce the shift in the post-processing position caused by the variation in the sheet size.

The components in the job controlling apparatus and the steps in the job controlling method according to the above exemplary embodiments of the present invention are realized by running programs (i.e., computer-executable program) stored in the RAM (i.e., computer-readable storage medium) or the ROM (i.e., computer-readable storage medium) in a computer. The programs and a computer-readable recording medium having the programs recorded thereon are included in the present invention.

The present invention can be embodied by, for example, a system, an apparatus, a method, a program, or a storage medium. Specifically, the present invention is applicable to a system including multiple devices or to an apparatus including one device.

The present invention can be embodied by directly or remotely supplying software programs (the programs corresponding to the flowcharts shown in FIGS. 12, 13, 15, and 17) realizing the functions according to the above exemplary embodiments to a system or an apparatus, the computer in which system or apparatus reads out and executes the program code that is supplied.

In this case, the present invention is embodied by the program code itself installed in the computer in order to realize the functions according to the above exemplary embodiments of the present invention in the computer. In other words, the present invention is applicable to the computer program itself for realizing the functions according to the above exemplary embodiments of the present invention.

In this case, the program code may be object codes, programs executed by an interpreter, or script data supplied to the operating system (OS) as long as the program code has the function of the programs.

The recording medium supplying the programs may be, for example, a flexible disk, a hard disk, an optical disk, a magneto-optical disk (MO), a compact disc-read only memory (CD-ROM), a compact disc recordable (CD-R), a compact disc rewritable (CD-RW), a magnetic tape, a nonvolatile memory card, a ROM, or a digital versatile disc (DVD) (a DVD-ROM or a DVD-R).

The computer programs according to the embodiments of the present invention or files that are compressed and that include an automatic installation function may be downloaded from a Web page on the Internet, which is accessed by using the browser of the client computer, in a recording medium, such as a hard disk.

Alternatively, the program code composing the programs according to the embodiments of the present invention may be divided into multiple files that are downloaded from different Web pages. In other words, the present invention is embodied by the Web server from which multiple users download the program files for realizing the functions according to the embodiments of the present invention in the computer.

The programs according to the embodiments of the present invention, which are encrypted and stored in a computer-readable storage medium such as a CD-ROM, may be distributed to users. In this case, users satisfying predetermined conditions may be allowed to download cryptographic-key information for deciphering the code from a Web page over the Internet and may execute and install the programs deciphered by using the downloaded cryptographic-key information in the computer.

The computer that executes the readout program code realizes the functions of the embodiments described above. In addition, the OS or the like running on the computer may execute all or part of the actual processing based on instructions in the program code to realize the functions of the embodiments described above.

Alternatively, after the program code read out from the recording medium has been written in a memory that is provided in a function expansion board included in the computer or in a function expansion unit connected to the computer, the CPU or the like in the function expansion board or the function expansion unit may execute all or part of the actual processing based on instructions in the program code to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-204833 filed Aug. 7, 2008, which is hereby incorporated by reference herein in its entirety.

What is claimed is:

1. An apparatus comprising:
a deriving unit configured to derive an amount of expansion or contraction by using a size of a sheet which is set before printing and a size of a printed sheet printed by the printer; and
a position changing unit configured to change a position where a post-processing is performed based on the derived amount of expansion or contraction.

2. The apparatus according to claim 1,
wherein the deriving unit derives the amount of expansion or contraction from a difference between the size of the sheet set for processing a job and the size of the printed sheet when a post-processing the job is performed.

3. The apparatus according to claim 1,
wherein the position changing unit adjusts the position in accordance with at least one of content of the post-processing and a sheet direction involved in a post-processing parameter indicating the content of the post-processing.

4. The apparatus according to claim 1,
wherein, if multiple sizes of sheets are specified for the post-processing in accordance with a job, the position changing unit determines a size of each sheet to adjust the position based on an amount of expansion or contraction of a smallest sheet.

5. The apparatus according to claim 1,
wherein the position changing unit adjusts the position in consideration of the expansion or contraction of a finished sheet size resulting from the expansion or contraction of the sheet so that the finished sheet size, before the sheet expands or contracts, is kept.

6. The apparatus according to claim 5,
wherein the position changing unit changes the position based on the amount of expansion or contraction or adjusts the position so that the finished sheet size, before the sheet expands or contracts, is kept in response to an instruction from a user.

7. The apparatus according to claim 1,
wherein the apparatus is a job controlling apparatus transmitting a job of performing the post-processing to the sheet on which the image is printed.

8. A method comprising:
deriving an amount of expansion or contraction by using a size of a sheet which is set before printing and a size of a printed sheet printed by the printer; and
changing the position where a post-processing is performed based on the derived amount of expansion or contraction.

9. The method according to claim 8,
wherein deriving the amount of expansion or contraction from a difference between the size of the sheet set for processing a job and the size of the printed sheet when a post-processing the job is performed.

10. The method according to claim 8,
wherein adjusting the position in accordance with at least one of content of the post-processing and a sheet direction involved in a post-processing parameter indicating the content of the post-processing.

11. The method according to claim 8,
wherein, if multiple sizes of sheets are specified for the post-processing in accordance with a job, the changing position further comprises determining a size of each sheet; and adjusting the position based on an amount of expansion or contraction of a smallest sheet.

12. The method according to claim 8,
wherein the changing position further comprises adjusting the position in consideration of the expansion or contraction of a finished sheet size resulting from the expansion or contraction of the sheet so that the finished sheet size, before the sheet expands or contracts, is kept.

13. The method according to claim 8,
wherein the method is a job controlling method in a job controlling apparatus transmitting a job of performing the post-processing to the sheet on which the image is printed.

14. A non-transitory computer-readable storage medium storing a computer-executable program for causing a computer to perform a method comprising:
deriving an amount of expansion or contraction by using a size of a sheet which is set before printing and a size of a printed sheet printed by the printer; and
changing a position where a post-processing is performed based on the derived amount of expansion or contraction.

15. The non-transitory computer-readable storage medium according to claim 14,
wherein deriving the amount of expansion or contraction from a difference between the size of the sheet set for processing a job and the size of the printed sheet when a post-processing the job is performed.

16. The non-transitory computer-readable storage medium according to claim 14,
wherein adjusting the position in accordance with at least one of content of the post-processing and a sheet direction involved in a post-processing parameter indicating the content of the post-processing.

17. The non-transitory computer-readable storage medium according to claim 14,
wherein, if multiple sizes of sheets are specified for the post-processing in accordance with a job, the changing position further comprises determining a size of each sheet; and adjusting the position based on an amount of expansion or contraction of a smallest sheet.

18. The non-transitory computer-readable storage medium according to claim 14,
wherein the changing position further comprises adjusting the position in consideration of the expansion or contraction of a finished sheet size resulting from the expansion or contraction of the sheet so that the finished sheet size, before the sheet expands or contracts, is kept.

* * * * *